United States Patent
Koga

(10) Patent No.: US 12,345,022 B2
(45) Date of Patent: Jul. 1, 2025

(54) EXCAVATOR AND MANAGEMENT APPARATUS FOR EXCAVATOR

(71) Applicant: SUMITOMO HEAVY INDUSTRIES, LTD., Tokyo (JP)

(72) Inventor: Masato Koga, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 276 days.

(21) Appl. No.: 17/654,876

(22) Filed: Mar. 15, 2022

(65) Prior Publication Data

US 2022/0205224 A1 Jun. 30, 2022

Related U.S. Application Data

(63) Continuation of application No. PCT/JP2020/035363, filed on Sep. 17, 2020.

(30) Foreign Application Priority Data

Sep. 19, 2019 (JP) ................................. 2019-170200

(51) Int. Cl.
*G06T 7/246* (2017.01)
*E02F 3/32* (2006.01)
(Continued)

(52) U.S. Cl.
CPC .............. *E02F 9/264* (2013.01); *E02F 9/261* (2013.01); *G06T 7/0008* (2013.01); *G06T 7/248* (2017.01); *G06T 11/00* (2013.01); *G06V 20/58* (2022.01); *E02F 3/32* (2013.01); *E02F 9/2221* (2013.01); *E02F 9/2285* (2013.01);
(Continued)

(58) Field of Classification Search
CPC . E02F 3/32; E02F 3/435; E02F 9/2221; E02F 9/2285; E02F 9/2292; E02F 9/2296; E02F 9/24; E02F 9/261; E02F 9/264; E02F 9/267; G06T 11/00; G06T 11/60; G06T 2200/24; G06T 2207/10016; G06T 2207/30164; G06T 2207/30252;
(Continued)

(56) References Cited

U.S. PATENT DOCUMENTS 8,744,133 B1 * 6/2014 Troy ....................... G06T 7/001
382/106
11,288,789 B1 * 3/2022 Chen ...................... G06T 7/001
(Continued)

FOREIGN PATENT DOCUMENTS

CN 106120947 A * 11/2016
EP 3702539 A1 * 9/2020 ................ E02F 9/24
(Continued)

OTHER PUBLICATIONS

International Search Report for PCT/JP2020/035363 mailed on Dec. 8, 2020.

*Primary Examiner* — Babar Sarwar
(74) *Attorney, Agent, or Firm* — IPUSA, PLLC

(57) ABSTRACT

An excavator includes a comparing part configured to compare first image data obtained by capturing, at a first timing, a bucket in a specified orientation, with second image data obtained by capturing, at a second timing different from the first timing, the bucket in the specified orientation; and an output part configured to output a comparison result obtained by the comparing part.

14 Claims, 9 Drawing Sheets

(51) Int. Cl.
*E02F 9/22* (2006.01)
*E02F 9/26* (2006.01)
*G06T 7/00* (2017.01)
*G06T 11/00* (2006.01)
*G06V 20/58* (2022.01)

(52) U.S. Cl.
CPC ............ *E02F 9/2292* (2013.01); *E02F 9/2296* (2013.01); *G06T 2207/30164* (2013.01); *G06T 2207/30252* (2013.01)

(58) Field of Classification Search
CPC ....... G06T 7/0008; G06T 7/001; G06T 7/246; G06T 7/248; G06V 20/58
See application file for complete search history.

(56) References Cited

U.S. PATENT DOCUMENTS

| | | | | |
|---|---|---|---|---|
| 11,580,800 B2 * | 2/2023 | Ghosh | ............... | G07C 5/008 |
| 2012/0306916 A1 * | 12/2012 | Marumoto | ............ | G01B 21/20 |
| | | | | 345/632 |
| 2013/0307456 A1 * | 11/2013 | Ono | ........................ | B60L 50/61 |
| | | | | 318/453 |
| 2015/0107075 A1 | 4/2015 | Clarke et al. | | |
| 2015/0287130 A1 * | 10/2015 | Vercollone | ........... | G06V 10/235 |
| | | | | 705/34 |
| 2017/0068756 A1 * | 3/2017 | Wilsher | .................. | G06F 30/20 |
| 2017/0284070 A1 * | 10/2017 | Matsuyama | ............. | E02F 9/20 |
| 2017/0293894 A1 * | 10/2017 | Taliwal | .................. | G06V 10/82 |
| 2018/0218304 A1 * | 8/2018 | Shike | .................. | G06Q 10/0631 |
| 2018/0260793 A1 * | 9/2018 | Li | ........................ | G06Q 40/08 |
| 2018/0293806 A1 * | 10/2018 | Zhang | .................... | G07C 5/006 |
| 2018/0328003 A1 * | 11/2018 | Tsukamoto | ........... | E02F 9/2242 |
| 2018/0340316 A1 * | 11/2018 | Izumikawa | ............. | E02F 3/435 |

FOREIGN PATENT DOCUMENTS

| | | | | |
|---|---|---|---|---|
| EP | 3832585 A1 * | 6/2021 | ............. | B66C 13/46 |
| JP | 2008-241300 | 10/2008 | | |
| JP | 2008241300 A * | 10/2008 | | |
| JP | 2015-063864 | 4/2015 | | |
| JP | 2016-536489 | 11/2016 | | |
| JP | 2017203367 A * | 11/2017 | | |
| JP | 2019108722 A * | 7/2019 | | |
| JP | 7257357 B2 * | 4/2023 | | |
| WO | 2011/099337 | 8/2011 | | |
| WO | WO-2014132903 A1 * | 9/2014 | ......... | G01M 5/0033 |
| WO | WO-2021020464 A1 * | 2/2021 | ................ | E02F 3/28 |

\* cited by examiner

EXCAVATOR AND MANAGEMENT APPARATUS FOR EXCAVATOR

CROSS-REFERENCE TO RELATED APPLICATIONS

The present application is a continuation application of International Application No. PCT/JP2020/035363 filed on Sep. 17, 2020, which claims priority to Japanese Patent Application No. 2019-170200, filed on Sep. 19, 2019. The contents of these applications are incorporated herein by reference in their entirety.

BACKGROUND

1. Technical Field

The present invention relates to an excavator and a management apparatus for the excavator.

2. Description of the Related Art

In the related art, there is known an excavator in which an operator operates the excavator to perform a specified motion in accordance with an instruction for the specified motion displayed on a display part in the cabin of the excavator, and a detected value received from a sensor during the execution of the specified motion operated by the operator, is stored in a storage part in association with the specified motion. The detected value from the sensor associated with the specified motion is transmitted to a management apparatus, for example, and is used for the diagnosis of a failure and the like of the excavator.

SUMMARY

According to an embodiment of the present invention, there is provided an excavator including a comparing part configured to compare first image data obtained by capturing, at a first timing, a bucket in a specified orientation, with second image data obtained by capturing, at a second timing different from the first timing, the bucket in the specified orientation; and an output part configured to output a comparison result obtained by the comparing part.

According to an embodiment of the present invention, there is provided an excavator including a comparing part configured to compare first moving image data obtained by capturing a bucket that has started a specified motion at a first timing, with second moving image data obtained by capturing the bucket that has started the specified motion at a second timing different from the first timing; and an output part configured to output a comparison result obtained by the comparing part.

According to an embodiment of the present invention, there is provided a management apparatus for an excavator, the management apparatus including a comparing part configured to compare first image data obtained by capturing, at a first timing, a bucket of the excavator in a specified orientation, with second image data obtained by capturing, at a second timing different from the first timing, the bucket in the specified orientation; and an output part configured to output a comparison result obtained by the comparing part.

According to an embodiment of the present invention, there is provided a management apparatus for an excavator, the management apparatus including a comparing part configured to compare first moving image data obtained by capturing a bucket of the excavator that has started a specified motion at a first timing, with second moving image data obtained by capturing the bucket that has started the specified motion at a second timing different from the first timing; and an output part configured to output a comparison result obtained by the comparing part.

DETAILED DESCRIPTION

In the related art, it is difficult to provide a sensor because the bucket of the excavator is a working portion that contacts the target surface of work and the like. Accordingly, in the related art, the management of the state of the bucket is performed by visual and/or manual measurement by a person and the like, and has thus been cumbersome.

Therefore, it is desirable to enable the state of the bucket to be easily identified.

Embodiments

Figure 1:
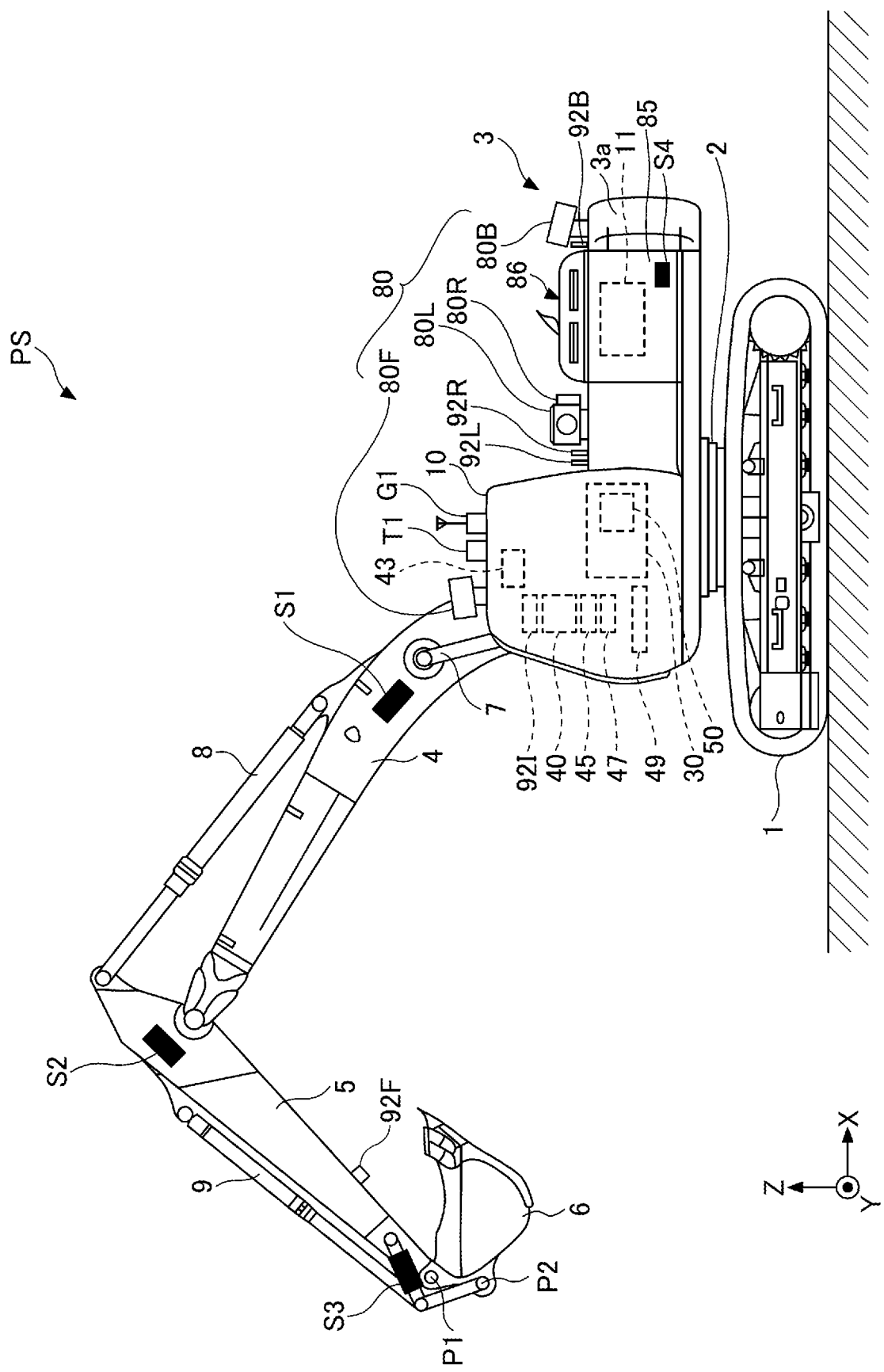
FIG. 1 is a side view illustrating an example of an excavator according to an embodiment of the present invention.

Embodiments will be described below with reference to the drawings. FIG. 1 is a side view illustrating an example of an excavator PS according to an embodiment of the present invention.

A lower traveling body 1 of the excavator PS is mounted with an upper turning body 3 that is turnable via a turning mechanism 2. A boom 4 is attached to the upper turning body 3. An arm 5 is attached to the end of the boom 4. A bucket 6 is attached to the leading end of the arm 5 as an end attachment (working portion) by an arm top pin P1 and a bucket link pin P2. End attachments may include a slope bucket, a dredging bucket, a breaker, and the like.

The boom 4, the arm 5, and the bucket 6 form a drilling attachment as an example of an attachment and are hydraulically driven by a boom cylinder 7, an arm cylinder 8, and a bucket cylinder 9, respectively. A boom angle sensor S1 is attached to the boom 4, an arm angle sensor S2 is attached to the arm 5, and a bucket angle sensor S3 is attached to the bucket 6. The drilling attachment may be provided with a bucket tilt mechanism. The boom angle sensor S1, the arm angle sensor S2, and the bucket angle sensor S3 may be referred to as "orientation (posture) sensors".

In the embodiment of FIG. 1, the boom angle sensor S1, the arm angle sensor S2, and the bucket angle sensor S3 each include a combination of an acceleration sensor and a gyro sensor. However, at least one of the boom angle sensor S1, the arm angle sensor S2, and the bucket angle sensor S3 may include only an acceleration sensor. The boom angle sensor S1 may be a stroke sensor attached to the boom cylinder 7, or may be a rotary encoder, a potentiometer, an inertia measuring device, or the like. The same applies to the arm angle sensor S2 and the bucket angle sensor S3.

The upper turning body 3 is equipped with a power source such as an engine 11 and a vehicle body tilt sensor S4, and is covered by a cover 3a. An object detecting device 80 is provided at the upper portion of the cover 3a of the upper turning body 3.

The object detecting device 80 is configured to detect an object that is present around the excavator PS. The object may be, for example, a person, an animal, a vehicle, a construction machine, a building, a wall, a fence, a hole, or the like. The object detecting device 80 may be, for example, an ultrasonic sensor, a millimeter wave radar, a stereo camera, a LIDAR, a distance image sensor, an infrared sensor, or the like.

In the present embodiment, the object detecting device 80 includes a front sensor 80F attached to the top front end of a cabin 10, a rear sensor 80B attached to the top rear end of the upper turning body 3, a left sensor 80L attached to the top left end of the upper turning body 3, and a right sensor 80R attached to the top right end of the upper turning body 3.

The left sensor 80L and the right sensor 80R are positioned inwardly from the side surfaces the excavator PS so as not to protrude from the side surfaces of the excavator PS. The rear sensor 80B is also positioned inwardly from the than the rear surface of the excavator PS so as not to protrude from the rear surface of the excavator PS.

The object detecting device 80 of the present embodiment may be configured to detect a predetermined object within a predetermined area set around the excavator PS. That is, the object detecting device 80 may be configured to identify the type of object. For example, the object detecting device 80 may be configured to distinguish between a person and an object other than a person.

The upper turning body 3 is provided with a cabin 10 as a driver's room. At the top of the cabin 10, a GPS device (GNSS receiver) G1 and a transmitting device T1 are provided. The GPS device (GNSS receiver) G1 detects the position of the excavator PS by the GPS function and supplies position data to a machine guidance device 50 in a controller 30. The transmitting device T1 transmits information to the outside of the excavator PS. The transmitting device T1 transmits information that can be received by the management apparatus 90, which will be described later, for example. In the cabin 10, the controller 30, a display device 40, a sound output device 43, an input device 45, and a storage device 47 are provided.

The controller 30 functions as a main control part for controlling the driving of the excavator PS. The controller 30 includes an arithmetic processing device including a CPU and an internal memory. Various functions of the controller 30 are implemented by executing, by the CPU, a program stored in an internal memory.

The controller 30 also functions as the machine guidance device 50 for guiding the operation of the excavator PS. The machine guidance device 50 reports, to the operator, work information, such as the distance between a target surface, which is the surface of the target landform set by the operator, and the working portion of the attachment. The distance between the target surface and the working portion of the attachment is, for example, the distance between the leading end (claw tip) of the bucket 6 that is an end attachment, the back of the bucket 6, the leading end of a breaker that is an end attachment, or the like, and the target surface. The machine guidance device 50 reports, to the operator, work information, and guides the operation of the excavator PS, via the display device 40, the sound output device 43, or the like.

In the present embodiment, the machine guidance device 50 is incorporated into the controller 30, but the machine guidance device 50 and the controller 30 may be provided separately from each other. In this case, similar to the controller 30, the machine guidance device 50 includes an arithmetic processing device including a CPU and an internal memory. Various functions of the machine guidance device 50 are implemented by executing, by the CPU, a program stored in an internal memory.

The display device 40 displays images including various kinds of work information in response to instructions from the machine guidance device 50 included in the controller 30. The display device 40 is, for example, an in-vehicle liquid crystal display connected to the machine guidance device 50.

The sound output device 43 outputs various types of sound information in response to a sound output instruction from the machine guidance device 50 included in the controller 30. The sound output device 43 includes, for example, an in-vehicle speaker connected to the machine guidance device 50. The sound output device 43 may also include an alarm device such as a buzzer.

The input device 45 is a device for the operator of the excavator PS to input various kinds of information to the controller 30 including the machine guidance device 50. The input device 45 may include, for example, a membrane switch provided on the surface of the display device 40. The input device 45 may include a touch panel or the like.

The storage device 47 is a device for storing various kinds of information. The storage device 47 is a non-volatile storage medium such as, for example, a semiconductor memory. The storage device 47 stores various kinds of information output by the controller 30 or the like including the machine guidance device 50.

A gate lock lever 49 is a mechanism provided between the door of the cabin 10 and the driver's seat to prevent incorrect operations of the excavator PS. The controller 30 controls a gate lock valve 49a (see FIG. 2) to be "closed" when the gate lock lever 49 is pushed down, and controls the gate lock valve 49a to be "open" when the gate lock lever 49 is pulled up.

Figure 2:
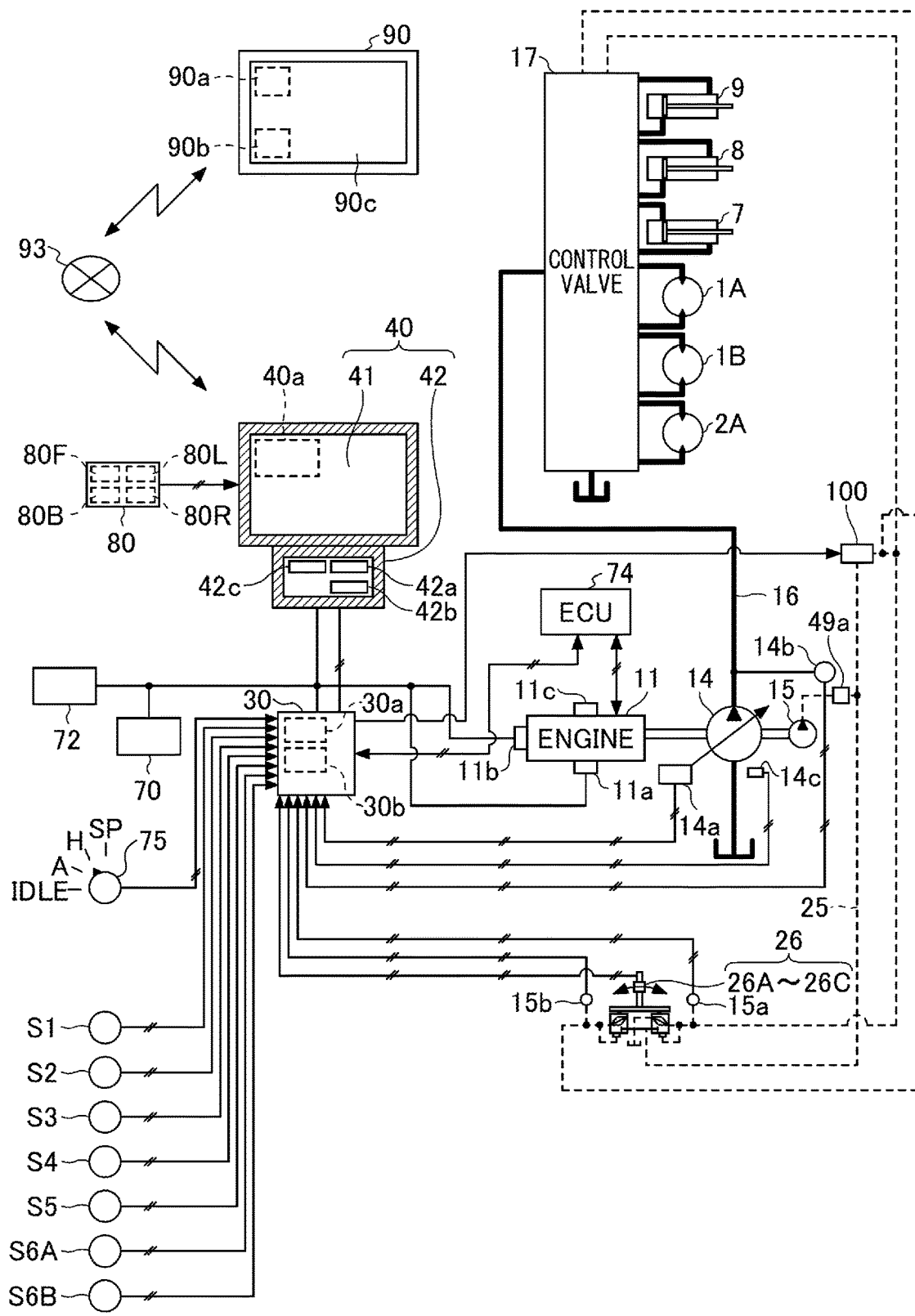
FIG. 2 is a block diagram illustrating an example of a configuration of a driving system of the excavator.

The gate lock valve 49a is a switching valve provided in the oil path between a control valve 17 and operation levers 26A to 26C (see FIG. 2 and the like). The gate lock valve 49a is configured to be opened and closed according to an instruction from the controller 30, but may be mechanically connected to the gate lock lever 49 and opened and closed in response to motions of the gate lock lever 49.

The gate lock valve 49a, in the "closed" state, shuts off the flow of hydraulic oil between the control valve 17 and the operation levers 26A to 26C or the like to disable operation of the operation levers 26A to 26C or the like. The gate lock valve 49a, in the "open" state, causes the hydraulic oil to flow through between the control valve 17 and the operation levers 26A to 26C or the like to enable operation of the operation levers 26A to 26C or the like. That is, when an operator sits on the driver's seat and pulls up the gate lock lever 49, the operator cannot exit the cabin 10 and becomes capable of operating the various operation devices 26 (see FIG. 2 and the like) (unlocked state). When the operator pushes down the gate lock lever 49, the operator is able to exit the cabin 10 and becomes incapable of operating the various operation devices 26 (locked state).

A sound collecting device 92 is disposed on the outside of the cabin 10, and includes a left microphone 92L, a right microphone 92R, a rear microphone 92B, and a front microphone 92F which are external microphones for collecting the sound around the cabin 10.

The sound collecting device 92 of the present embodiment may start collecting sound simultaneously with the timing at which the object detecting device 80 acquires data around the excavator PS.

The sound data collected by the sound collecting device 92 may be output together with the data acquired by the object detecting device 80. Specifically, for example, the sound data is reproduced in accordance with image data (still image data or moving image data) captured by the object detecting device 80.

The image data captured by the object detecting device 80 is, for example, image data obtained by capturing the motion of the bucket 6. In the present embodiment, by reproducing the motion of the excavator PS and the sound data together as described above, a specialist staff member who performs the maintenance of the excavator PS can confirm the state of the bucket 6 and the like of the excavator PS.

The sound collecting device 92 is disposed within the cabin 10 and includes an internal microphone 92I for collecting sound within the cabin 10. The sound collected by the left microphone 92L, the right microphone 92R, the rear microphone 92B, the front microphone 92F, and the internal microphone 92I include sound such as, for example, voice sound such as the language sound emitted by humans, and machine sounds such as the engine sound of the excavator PS, the sound at the work site, and the like.

The left microphone 92L, the right microphone 92R, and the rear microphone 92B respectively capture sound from the left, right, and rear directions from the upper turning body 3 toward the cabin 10. In the present embodiment, the left microphone 92L, the right microphone 92R, and the rear microphone 92B are located on top of the cover 3a of the upper turning body 3 and are located near the left sensor 80L, the right sensor 80R, and the rear sensor 80B, respectively.

Thus, the left microphone 92L, the right microphone 92R, and the rear microphone 92B are positioned near the left sensor 80L, the right sensor 80R, and the rear sensor 80B, respectively, so that wiring can be easily routed. Note that the left microphone 92L, the right microphone 92R, and the rear microphone 92B may be disposed, for example, on top of the cabin 10.

The left microphone 92L, the right microphone 92R, and the rear microphone 92B are each connected to the controller 30 via wiring and transmit noise to the controller 30.

Further, the left microphone 92L and the right microphone 92R are positioned inwardly from the sides surfaces of the excavator PS so as not to protrude from the sides surfaces of the excavator PS. The rear microphone 92B is positioned inwardly from the rear surface of the excavator PS so as not to protrude from the rear surface of the excavator PS.

The front microphone 92F captures a sound from the front direction from the upper turning body 3 toward the cabin 10. In the present embodiment, the front microphone 92F is positioned on the arm 5. The front microphone 92F is connected to the controller 30 via wiring and transmits the collected sound to the controller 30. The front microphone 92F may be disposed on the boom 4, the bucket 6, or on top of the cabin 10, for example.

The internal microphone 92I captures the internal sound of the cabin 10, e.g., the voice sound emitted by an operator. In the present embodiment, the internal microphone 92I is disposed on the inner wall surface of the cabin 10. The internal microphone 92I is connected to the controller 30 via wiring and transmits the collected sound to the controller 30. The internal microphone 92I may be embedded in the display device 40, for example.

Each of the left microphone 92L, the right microphone 92R, the rear microphone 92B, the front microphone 92F, and the internal microphone 92I may be, for example, a mono-directional microphone that tends to capture the sound in a particular direction. However, one microphone may be used to implement the functions of two or more of the following microphones: the left microphone 92L, the right microphone 92R, the rear microphone 92B, and the front microphone 92F, by using a non-directional (omnidirectional) microphone that captures the sound from all directions equally. This reduces the number of microphones that collect the sound around the excavator PS.

An engine room 85 is formed in the upper turning body 3, and the engine 11 is installed in the engine room 85. The engine room 85 is covered with an engine cover 86.

FIG. 2 is a block diagram illustrating an example of a configuration of a driving system of the excavator PS in FIG. 1. In the example of FIG. 2, the excavator PS is included in a management system 1000 of the excavator PS. The management system 1000 includes the excavator PS and a management apparatus 90 for communicating with the excavator PS. Any number of excavators PS may be included in the management system 1000.

The driving system of the excavator PS mainly includes an engine 11, a main pump 14, a pilot pump 15, a control valve 17, an operation device 26, a controller 30, an engine control device (ECU) 74, an engine revolution speed adjustment dial 75, an operation valve 100, and the like.

The engine 11 is the driving source of the excavator PS and is, for example, a diesel engine operating to maintain a predetermined revolution speed. The output shaft of the engine 11 is connected to the input shaft of the main pump 14 and the pilot pump 15.

The main pump 14 is a hydraulic pump for supplying hydraulic oil to the control valve 17 via a high pressure hydraulic line 16, and is a swash plate variable capacitive hydraulic pump, for example.

The pilot pump 15 is a hydraulic pump for supplying hydraulic oil to various hydraulic control devices via a pilot line 25, and is a fixed capacitive hydraulic pump, for example.

The control valve 17 is a hydraulic control valve which controls the hydraulic system in the excavator PS. The control valve 17 selectively supplies hydraulic oil supplied from the main pump 14 to one or more of the boom cylinder 7, the arm cylinder 8, the bucket cylinder 9, a traveling hydraulic motor (right) 1A, a traveling hydraulic motor (left) 1B, and a turning hydraulic motor 2A, for example. In the following description, the boom cylinder 7, the arm cylinder 8, the bucket cylinder 9, the traveling hydraulic motor (right) 1A, the traveling hydraulic motor (left) 1B, and the turning hydraulic motor 2A are collectively referred to as "hydraulic actuators".

The operation device 26 is a device used by the operator for operation of the hydraulic actuator, via the pilot line 25, for supplying hydraulic oil supplied from the pilot pump 15 to a pilot port of a flow control valve corresponding to each of the hydraulic actuators. The pressure of the hydraulic oil supplied to each of the pilot ports is in accordance with the direction and amount of operation with respect to the operation levers 26A to 26C corresponding to each of the hydraulic actuators.

The controller 30 is a control device for controlling the excavator PS and is configured by a computer including, for example, a CPU, a RAM, a ROM, and the like. The CPU of the controller 30 executes the processing corresponding to each program by executing the programs while reading the programs corresponding to the motions and functions of the excavator PS from the ROM and loading the programs in the RAM.

The ECU 74 is a device for controlling the engine 11. The ECU 74 outputs, to the engine 11, for example, the fuel injection amount and the like for controlling the revolution speed of the engine 11 in accordance with the engine revolution speed (mode) set by an operator with the engine revolution speed adjustment dial 75 based on an instruction from the controller 30.

The engine revolution speed adjustment dial 75 is a dial for adjusting the engine revolution speed, and in an embodiment of the present invention, it is possible to switch the engine revolution speed in four stages. For example, the engine revolution speed adjustment dial 75 allows for switching the engine revolution speed in the four stages of an SP mode, an H mode, an A mode, and an IDLE mode. FIG. 2 illustrates a state in which the H mode is selected with the engine revolution speed adjustment dial 75.

The SP mode is a work mode selected when the amount of work is to be prioritized, and the highest engine revolution speed is used. The H mode is a work mode selected when both the amount of work and fuel economy are to be achieved, and the second highest engine revolution speed is used. The A mode is a work mode selected to operate the excavator PS with low noise while prioritizing fuel economy, and the third highest engine revolution speed is used. The IDLE mode is the work mode selected when the engine is to be idle, and the lowest engine revolution speed is used. The engine 11 is controlled to have a constant engine revolution speed, according to the engine revolution speed of the work mode set with the engine revolution speed adjustment dial 75.

The operation valve 100 is a valve used by the controller 30 for operation of the hydraulic actuator, and supplies, via the pilot line 25, hydraulic oil supplied from the pilot pump 15 to the pilot port of the flow control valve corresponding to each of the hydraulic actuators. The pressure of the hydraulic oil supplied to each of the pilot ports is the pressure corresponding to the control signal from the controller 30. The operation valve 100 is provided at least one of the rod side and the bottom side according to the specified motion, with respect to the cylinders of the boom 4, the arm 5, and the bucket 6 forming the attachment. The operation valve 100 may be provided on both the rod side and the bottom side.

The specified motion of the present embodiment is a motion from a predetermined first specified orientation to a predetermined second specified orientation. Accordingly, the specified motion starts at the first specified orientation and ends at the second specified orientation. The first specified orientation and the second specified orientation may be different or the same. That is, the specified motion may be an operation to change the orientation from one specified orientation to another, or an operation to make a predetermined motion from a certain specified orientation, and then return to the specified orientation.

The traveling hydraulic motor (right) 1A, the traveling hydraulic motor (left) 1B, and the turning hydraulic motor 2A are provided on at least one of the discharge side and the suction side. These motors may be provided on both the discharge side and the suction side.

In this case, the specified motion can be performed even when the operation device 26 is in the neutral position. Further, a pressure reducing valve disposed between the control valve 17 and the operation device 26 may function as the operation valve 100. In this case, by sending a pressure reduction instruction from the controller 30 to the pressure reduction valve with the operation device 26 tilted to the maximum degree, a stable operation instruction can be given to the control valve 17.

The excavator PS is provided with the display device 40.

The display device 40 is connected to the controller 30 via a communication network such as CAN (Controller Area Network), LIN (Local Interconnect Network), or the like. The display device 40 may be connected to the controller 30 via an exclusive-use line.

The display device 40 includes a conversion processing part 40a for generating an image to be displayed on an image display part 41. The conversion processing part 40a generates a sensor image that is displayed on the image display part 41 based on the output of the object detecting device 80. Therefore, the object detecting device 80 is connected to the display device 40, for example, via an exclusive-use line. The conversion processing part 40a generates an image to be displayed on the image display part 41 based on the output of the controller 30.

The object detecting device 80 includes the front sensor 80F, the left sensor 80L, the rear sensor 80B, and the right sensor 80R.

The front sensor 80F is provided on the front side of the cabin 10, e.g., the ceiling portion of the cabin 10, to detect the state in front of the excavator PS and the motions of the boom 4, the arm 5, and the bucket 6. The left sensor 80L is provided, for example, on the left side on the upper portion on the cover 3a of the upper turning body 3 to detect the state on the left of the excavator PS.

The rear sensor 80B is provided on the rear side of the upper turning body 3, for example, on the rear side on the upper portion on the cover 3a of the upper turning body 3, and detects the state behind the excavator PS. The right sensor 80R is provided, for example, on the right side on the upper portion on the cover 3a of the upper turning body 3, and detects the state on the right of the excavator PS.

For example, the front sensor 80F, the left sensor 80L, the rear sensor 80B, and the right sensor 80R are digital cameras having an imaging device such as, for example, a CCD or CMOS.

In this case, the front sensor 80F is provided on the front side of the cabin 10, such as the ceiling portion of the cabin 10, and captures an image of the area in front of the excavator PS and the motions of the boom 4, the arm 5, and the bucket 6. The left sensor 80L is provided, for example, on the left side on the upper portion on the cover 3a of the upper turning body 3, and captures an image of the area on the left of the excavator PS.

The rear sensor 80B is provided on the rear side of the upper turning body 3, for example, on the rear side on the upper portion on the cover 3a of the upper turning body 3, and captures an image of an area behind the excavator PS. The right sensor 80R is provided, for example, on the right side on the upper portion on the cover 3a of the upper turning body 3, and captures an image of the area on the right of the excavator PS.

Each sensor transmits the captured image to the display device 40 provided in the cabin 10.

The conversion processing part 40a may be implemented as a function provided by the controller 30 rather than as a function provided by the display device 40. In this case, the object detecting device 80 is connected to the controller 30 rather than to the display device 40.

The display device 40 includes a switch panel as an input part 42. The switch panel is a panel that includes various hardware switches. The switch panel includes, for example, a light switch 42a, a wiper switch 42b, and a window washer switch 42c, as hardware buttons.

The light switch 42a is a switch for switching on and off the light mounted on the outside of the cabin 10. The wiper switch 42b is a switch for switching the wiper on and off. The window washer switch 42c is a switch for spraying the window washer liquid.

The display device 40 operates by receiving power from a storage battery 70. The storage battery 70 is charged with power generated by an alternator 11a (generator) of the engine 11. The power of the storage battery 70 is also supplied to electrical components 72 of the excavator PS other than the controller 30 and the display device 40. A starter 11b of the engine 11 is also powered by power from the storage battery 70 to start the engine 11.

The engine 11 is controlled by the ECU 74. From the ECU 74, various kinds of data representing the state of the engine 11 (for example, data representing the cooling water temperature detected by a water temperature sensor lie) is constantly transmitted to the controller 30. Accordingly, the controller 30 stores this data in a temporary storage part 30a and can transmit the data to the display device 40 when necessary.

Various kinds of data are supplied to the controller 30 as follows and are stored in the temporary storage part 30a of the controller 30. The stored data may be transmitted to the display device 40 when necessary.

First, the regulator 14a of the main pump 14, which is a variable capacitive hydraulic pump, transmits data indicative of swash plate angle with respect to the controller 30. Further, data representing the discharge pressure of the main pump 14 is transmitted from a discharge pressure sensor 14b to the controller 30. An oil temperature sensor 14c is provided in the pipeline between the main pump 14 and the tank in which hydraulic oil taken in by the main pump 14 is stored, and data representing the temperature of the hydraulic oil flowing through this pipeline is transmitted from the oil temperature sensor 14c to the controller 30.

The pilot pressure fed to the control valve 17 when the operation levers 26A to 26C are operated is detected by hydraulic sensors 15a and 15b and data indicative of the detected pilot pressure is transmitted to the controller 30.

Further, from the engine revolution speed adjustment dial 75, data indicating the setting state of the engine revolution speed is constantly transmitted to the controller 30.

The excavator PS is capable of communicating with the management apparatus 90 via the communication network 93.

The management apparatus 90 is, for example, a computer installed in the manufacturer of the excavator PS or a service center, and a professional staff member (designer or the like) can remotely identify the status of the excavator PS. The controller 30 stores the data of the detected value from the various state detecting sensors included in the excavator PS, in the temporary storage part 30a or the like, and transmits the stored data to the management apparatus 90.

The controller 30 may have a wireless communication function and be capable of communicating with the management apparatus 90 via a communication network 93. The professional staff member analyzes the data of the detected values from the various state detecting sensors transmitted from the excavator PS to the management apparatus 90 and received by a receiving part 90a of the management apparatus 90, and determines the state of the excavator PS.

For example, the professional staff member may diagnose whether there is a failure or malfunction, and if there is a failure or malfunction, the professional staff member may identify the location of the failure or malfunction, the factor causing the failure or malfunction, or the like. Accordingly, the staff member can bring the parts that are necessary for repairing the excavator PS in advance, thereby reducing the time spent for maintenance and repair. Details of the functions of the controller 30 will be described below.

The management apparatus 90 includes a processing part 90b. The processing part 90b may perform calculation processing of the detected values from the various state detecting sensors that are input using a predetermined program and transmitted from the excavator PS by the program. For example, the processing part 90b includes an input diagnosis program and may perform failure diagnosis or failure prediction by using the detected value transmitted from the excavator PS by the diagnosis program. The calculation result of the processing part 90b may be displayed on the display part 90c of the management apparatus 90.

The management apparatus 90 may be a device capable of communicating indirectly with the excavator PS via a server provided in the manufacturer of the excavator PS or a service center. The management apparatus 90 may be a stationary type computer installed at the manufacturer or a service center, or a portable computer that can be carried by a person in charge of the operation, for example, what is known as a smartphone, a tablet terminal, or the like that is a multifunction-type portable information terminal as a portable terminal.

In the case where the management apparatus 90 is a portable type, the management apparatus 90 can be carried to an inspection or repair site, and, therefore, inspection or repair work can be performed while looking at a display (the display part 90c) of the management apparatus 90. As a result, the efficiency of inspection or repair work can be improved.

Further, in the case where a mobile terminal is used, communication with an excavator may be performed directly by short range communication such as Bluetooth (registered trademark) or infrared communication without using a communication network. In this case, an instruction to execute the specified motion is transmitted from the mobile terminal to the excavator by operation of screen input or sound input to the mobile terminal. That is, an instruction to store the detected value from the state detecting sensor during the specified motion in association with the specified motion is transmitted from the portable terminal to the excavator. Then, the operation result of the specified motion can be transmitted from the excavator to the mobile terminal, so that the operation result of the specified motion can be confirmed on the screen of the mobile terminal.

The various status detecting sensors included in the excavator PS are sensors that detect the state of motion of each part of the excavator PS. Various state detecting sensors include the boom angle sensor S1, the arm angle sensor S2, the bucket angle sensor S3, the vehicle body tilt sensor S4, a turning angle sensor S5, a traveling rotation sensor (right) S6A, a traveling rotation sensor (left) S6B, and the like.

The boom angle sensor S1 is provided in the support portion (joint) of the boom 4 in the upper turning body 3, and detects the angle (boom angle) from the horizontal plane of the boom 4. Any angle sensor, such as a rotary potentiometer, may be used for the boom angle sensor S1, and the same applies to the arm angle sensor S2 and the bucket angle sensor S3, which will be described later. The detected boom angle is transmitted to the controller 30.

The arm angle sensor S2 is provided in a support portion (joint) of the arm 5 in the boom 4, and detects the angle (arm angle) of the arm 5 with respect to the boom 4. The detected arm angle is transmitted to the controller 30.

The bucket angle sensor S3 is provided in a support portion (joint) of the bucket 6 in the arm 5 to detect the angle (bucket angle) of the bucket 6 with respect to the arm 5. The detected bucket angle is transmitted to the controller 30.

The vehicle body tilt sensor S4 is a sensor that detects the tilt angle in two axial directions (front-rear direction and left-right direction) with respect to the horizontal plane of the excavator PS. The vehicle body tilt sensor S4 may be, for example, a liquid encapsulated capacitive tilt sensor, or any tilt sensor. The detected tilt angle is transmitted to the controller 30.

The turning angle sensor S5 detects the turning angle of the upper turning body 3 turned by the turning mechanism 2. Any angle sensor, such as, for example, a rotary encoder, may be used for the turning angle sensor S5. The detected turning angle is transmitted to the controller 30.

The traveling rotation sensor (right) S6A and the traveling rotation sensor (left) S6B detect the revolution speeds of the traveling hydraulic motor (right) 1A and the traveling hydraulic motor (left) 1B, respectively. Any rotation sensor, such as a magnetic type, may be used for the traveling rotation sensor (right) S6A and the traveling rotation sensor (left) S6B. Each detected rotational speed is transmitted to the controller 30.

As described above, various state detecting sensors included in the excavator PS include the water temperature sensor 11c, the regulator 14a, the discharge pressure sensor 14b, the oil temperature sensor 14c, the hydraulic sensors 15a and 15b, the engine revolution speed adjustment dial 75, and the object detecting device 80. The detected values detected by these sensors are transmitted to the controller 30. The data transmitted from the various state detecting sensors included in the excavator PS to the controller 30 is stored in the temporary storage part 30a of the controller 30.

The controller 30 acquires image data of the bucket 6 captured by the object detecting device 80, which is one of the state detecting sensors, and analyzes the state of the bucket 6 by using the image data. The image data of the bucket 6 captured by the object detecting device 80 includes still image data representing a still image and moving image data representing a moving image.

The data acquired by the object detecting device 80 is not limited to image data. For example, if the object detecting device 80 is an ultrasonic sensor, the object detecting device 80 acquires the data of the surroundings of the excavator PS by receiving the reflected wave of the ultrasonic wave radiated toward the bucket 6, instead of image data.

The data of the surroundings of the excavator PS according to the present embodiment is data referenced for detecting the presence or absence of an object around the excavator PS, and the object detecting device 80 may be a device for acquiring data used for detecting an object around the excavator PS.

More specifically, the controller 30 causes the excavator PS to perform a certain specified motion and acquires the moving image data obtained by capturing the bucket 6 during the specified motion. The controller 30 compares the acquired moving image data with the moving image data of the specified motion of the same type performed in the past, and outputs the result of the comparison.

By this comparison, the controller 30 according to the embodiment can allow a worker or the like to easily identify the amount of wear of the leading end (claw tip) of the bucket 6 and the degree of the rattle of the bucket 6. Details of the amount of wear of the claw tip of the bucket 6 and the degree of the rattle will be described later.

Figure 3:
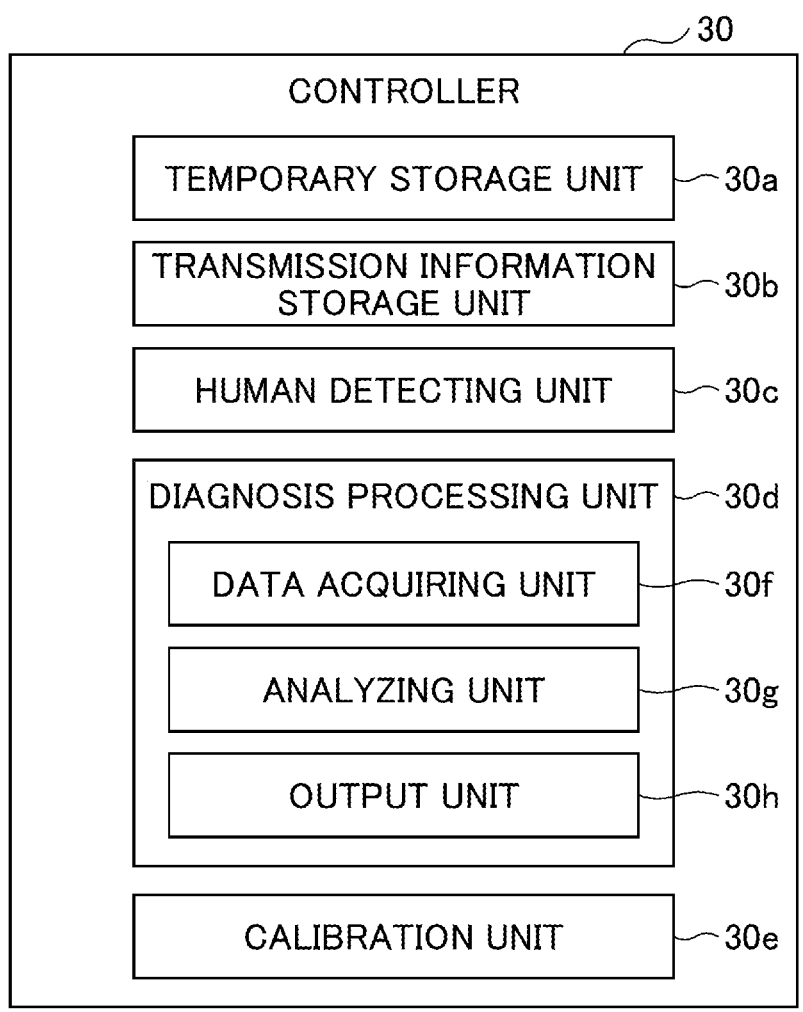
FIG. 3 is a diagram illustrating the functions of a controller.

Next, the function of the controller 30 according to the present embodiment will be described with reference to FIG. 3. FIG. 3 is a diagram illustrating a function of a controller.

The controller 30 according to the present embodiment includes a temporary storage part 30a, a transmission information storage part 30b, a human detecting part 30c, a diagnosis processing part 30d, and a calibration part 30e.

The temporary storage part 30a temporarily stores data of a detected value from various state detecting sensors included in the excavator PS. Therefore, the image data of the bucket 6 captured by the object detecting device 80 included in the state detecting sensor is temporarily stored in the temporary storage part 30a.

The transmission information storage part 30b stores the transmission information to be transmitted to the management apparatus 90. Details of the transmission information are described later.

The human detecting part 30c detects a person present around the excavator PS based on data of the surroundings of the excavator PS acquired by the object detecting device 80. That is, the human detecting part 30c determines whether there is a person or the like around the excavator PS based on image data around the excavator PS captured by the object detecting device 80. A variety of human detecting sensors capable of detecting humans can be used to determine whether there is a person around the excavator PS.

The diagnosis processing part 30d performs various types of diagnosis according to the diagnosed portions of the excavator PS. The diagnosis processing part 30d according to the present embodiment performs analysis of the state of the bucket 6 by using image data captured by the object detecting device 80. In order to diagnose the state of the bucket 6, both the moving image data and the still image data included in the image data may be used.

Specifically, the diagnosis processing part 30d includes a data acquiring part 30f, an analyzing part 30g, and an output part 30h. The data acquiring part 30f acquires image data captured by the object detecting device 80 while the excavator PS is performing the specified motion. Note that the specified motion includes the first specified orientation and the second specified orientation.

The image data is stored in the transmission information storage part 30b as transmission information associated with information identifying a specified motion that the excavator PS has been performing. The information identifying the specified motion may be, for example, the name of the specified motion.

The analyzing part 30g analyzes the state of the bucket 6 based on the image data acquired by the data acquiring part 30f. Details of the processing of the analyzing part 30g will be described later. The analysis result of the analyzing part 30g may be included in the transmission information.

That is, the transmission information according to the present embodiment may include information identifying a specified motion performed by the excavator PS, a detection value of the state detecting sensor including image data captured during the specified motion, and an analysis result of the analyzing part 30g.

The results of the analysis by the analyzing part 30g include information indicating the degree of the rattle of the bucket 6. The analysis result of the analyzing part 30g includes information indicating the amount of wear of the claw tip of the bucket 6. The analysis results obtained by the analyzing part 30g may include information indicating the degree of the rattle of the bucket 6 and information indicating the amount of wear of the claw tip.

The analysis results may also include information indicative of the state of the bucket 6 estimated from the amount of wear of the claw tip of the bucket 6 and the degree of the rattle of the bucket 6. Specifically, information indicating the state of the bucket 6 indicates whether it is desirable to replace the claw tip of the bucket 6, whether the rattle of the bucket 6 is greater than the allowable range, and the like. That is, the information indicating the state of the bucket 6 includes the necessity of replacing the claw tip based on the amount of wear of the claw tip of the bucket 6, the necessity of inspection based on the degree of the rattle of the bucket 6, and the like. The analyzing part 30g may preliminarily hold a threshold value for determining whether the claw tip needs to be replaced or not, a value indicating an allowable range of rattle, or the like.

The transmission information may include, for example, the date and time when the image data has been captured (the date and time when the specified motion has been performed), the machine body identification information for identifying the excavator PS, the operation time of the excavator PS, and the like.

The output part 30h outputs an analysis result by the analyzing part 30g. According to the present embodiment, transmitting the transmission information including the analysis result to the management apparatus 90 may be expressed as outputting the analysis result. In the present embodiment, displaying the transmission information including the analysis result on the image display part 41 of the display device 40 may be expressed as outputting the analysis result.

The calibration part 30e according to the present embodiment calibrates the positional relationship between the leading end of the bucket 6 and the boom foot pin position (see FIG. 8) in accordance with the analysis result of the state of the bucket 6 obtained by the diagnosis processing part 30d. The details of the processing of the calibration part 30e will be described later.

Figure 4:
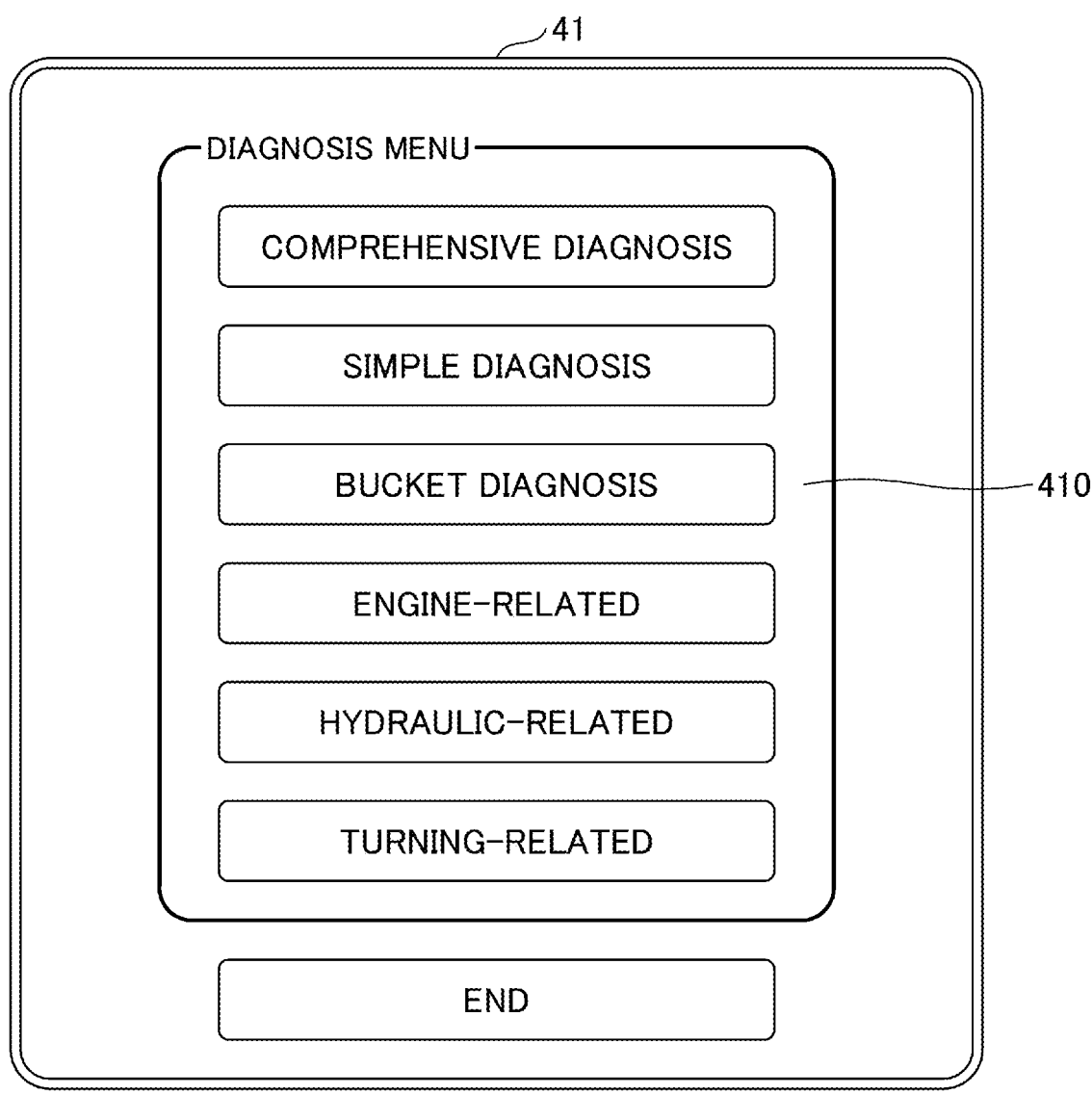
FIG. 4 is a diagram illustrating an example of a screen for selecting a diagnosis menu displayed on an image display part.

Next, the process by the diagnosis processing part 30d according to the present embodiment will be described. FIG. 4 is a diagram illustrating an example of a diagnosis menu selection screen displayed on an image display part.

As illustrated in FIG. 4, the diagnosis menu selection screen includes a diagnosis menu display part 410. The image displayed on the diagnosis menu display part 410 is generated from various kinds of data transmitted from the controller 30 by the conversion processing part 40a of the display device 40.

The diagnosis menu display part 410 displays a list of a plurality of diagnosis items according to a diagnosis portion or the like. In the example illustrated in FIG. 4, a list of six diagnosis items of "comprehensive diagnosis", "simple diagnosis", "bucket diagnosis", "engine-related", "hydraulic-related", and "turning-related", is displayed in the diagnosis menu display part 410. The diagnosis item is previously stored in the ROM of the controller 30 or the like. With respect to each of the diagnosis items, there may be one type of specified motion performed to perform the diagnosis, or there may be more than one type.

Further, the image display part 41 displays a menu of "end" which is used when the display of the diagnosis menu selection screen is to be ended. The operator can select any diagnosis item by an operation of touching the diagnosis item to be executed, in the diagnosis menu selection screen displayed on the image display part 41. The method of selecting the diagnosis item may be, for example, a button operation in place of a touch operation.

"Comprehensive diagnosis" is a diagnosis item for comprehensively diagnosing whether each part of the excavator PS is normal, and is associated with, for example, specified motions that are engine-related, hydraulic-related, and turning-related.

When the operator selects the "comprehensive diagnosis", the controller 30 causes the excavator PS to perform specified motions that are engine-related, hydraulic-related, and turning-related in a predetermined order, and causes the information identifying the specified motion performed to be associated with the detected value of the state detecting sensor acquired during the specified motion. The "comprehensive diagnosis" may be associated with other specified motions in place of or together with the above-described specified motions (engine-related, hydraulic-related, and turning-related specified motions).

The specified motion for collecting the data for the diagnosis may be performed automatically, and for each motion, the specified motion for the diagnosis may be manually performed by a lever operation by an operator by displaying guidance on the display device.

"Simple diagnosis" is a diagnosis item for simply diagnosing whether each part of the excavator PS is normal. For example, "simple diagnosis" is associated with a specified motion that is part of engine-related motions and part of hydraulic-related motions, excluding attachment motions and turning motions of the excavator PS. When the operator selects "simple diagnosis", the controller 30 causes the excavator PS to perform a specified motion that is part of engine-related motions and part of hydraulic-related motions, and causes the information identifying the specified motion performed to be associated with the detected value of the state detecting sensor acquired during the specified motion.

Further, the "simple diagnosis" may be associated with other specified motions in place of or together with the above-described specified motions (engine-related, hydraulic-related, and turning-related specified motions).

"Bucket diagnosis" is a diagnosis item for analyzing the state of the bucket 6 of the excavator PS. For example, when "bucket diagnosis" is selected, the controller 30 causes the excavator PS to perform the specified motion associated with "bucket diagnosis", and causes the information identifying the specified motion performed to be associated with the detected value of the state detecting sensor including the image data acquired during the specified motion.

The specified motion associated with the "bucket diagnosis" includes, for example, a motion of turning the upper turning body 3 while maintaining the first specified orientation set to be an orientation of the attachment, or a motion of moving the attachment without turning the upper turning body 3. The specified motion associated with the "bucket diagnosis" includes a motion of changing the angle of the bucket 6 with respect to the arm 5 by the hydraulic drive by the bucket cylinder 9.

The motion of turning the upper turning body 3 includes an oscillating turning motion and a repetitive turning motion. When the lever operation is performed, this motion can be implemented by an operation of repetitively tilting the lever from left to right. The oscillating turning motion is a motion in which the turning motion is repeated from left to right at a predetermined cycle. When the lever operation is performed, this motion can be implemented by tilting the lever in one direction and then returning the lever to neutral.

"Engine-related" is a diagnosis item that includes one or more specified motions for diagnosing whether the engine 11 is normal. When the operator selects "engine-related", the controller 30 causes the excavator PS to perform an engine-related specified motion.

"Hydraulic-related" is a diagnosis item that includes one or more specified motions for diagnosing whether a hydraulic system is normal, including, for example, one or more specified motions for diagnosing a hydraulic pump such as the main pump 14, the pilot pump 15, or the like, or a hydraulic actuator.

"Hydraulic-related" includes, for example, "closing the arm to the stroke end (arm closing motion)" as a specified motion α and "raising the boom to the stroke end (boom raising motion) from the state where the arm is closed" as a specified motion β. "Hydraulic-related" may also include other specified motions in place of or together with the above specified motions (specified motions α, β).

Here, an example of a specified motion with respect to an attachment such as the boom 4 or the arm 5 will be described. First, by outputting an instruction from the controller 30 to the operation valve 100, the boom 4 is rotated to the stroke end when the boom is raised. Subsequently, a continuous load is applied. That is, hydraulic oil continues to flow to the boom cylinder 7 by the control valve 17. In this state, the boom 4 has reached the stroke end, and, therefore, the hydraulic oil is discharged from the relief valve to the tank. By reaching the stroke end of the cylinder in this manner, the load can be continuously applied.

This enables detection of diagnosis data with good reproducibility and in a stable state in any work environment. The same applies to the arm 5 and the bucket 6. Further, after reaching the stroke end of the cylinder, the load may be changed by adjusting the regulator 14a of the main pump 14 or by changing the engine revolution speed.

By detecting a change in the cylinder pressure of an attachment such as the boom 4 or a change in the discharge pressure of the main pump 14 when a load is changed, a dynamic state can be reproduced and the diagnosis accuracy can be further improved. As a result, the main pump 14 and the engine 11 can be diagnosed as well as the hydraulic circuit.

"Turning-related" is a diagnosis item that includes one or more specified motions for diagnosing whether the turning mechanism 2 (the turning hydraulic motor 2A, a turning reduction gear, and the like) is normal. "Turning-related" includes, for example, "turning while the attachment is closed (turning motion)" as a specified motion. "Turning-related" may also include other specified motions in place of or together with the above specified motion (specified motion of the turning operation). Here, an example of a specified motion for a driving part using a hydraulic motor such as turning or traveling will be described.

First, by outputting an instruction from the controller 30 to the operation valve 100, an attachment, such as the boom 4, is set to a predetermined orientation. This is because, in the turning diagnosis, in particular, the turning load is greatly affected by the turning inertial moment based on the change in orientation of the attachment. Therefore, the boom 4, the arm 5, the bucket 6, or the like is driven so that the attachment is in a predetermined orientation.

Additionally, the driver may be prompted to change the bucket 6 to a predetermined bucket 6, when a heavy end attachment, such as a breaker, is mounted. In this way, the attachment is adjusted before driving the turning drive part so that the moment of inertia generated during the turning is the same. After adjustment is completed, a predetermined drive instruction is output from the controller 30 to the operation valve 100 to perform the turning motion. The turning hydraulic motor 2A can execute the specified motion for the turning based on a driving instruction for causing the turning hydraulic motor 2A to accelerate, operate at a constant speed, and to decelerate.

Accordingly, it is possible to diagnose the turning hydraulic motor 2A and the hydraulic circuit and the turning reduction gear for the turning hydraulic motor 2A. For example, if a failure occurs in the relief valve of the hydraulic circuit, the turning acceleration will be degraded. This failure can be identified by a change in the pressure detection value of the hydraulic circuit of the turning hydraulic motor 2A.

Figure 5:
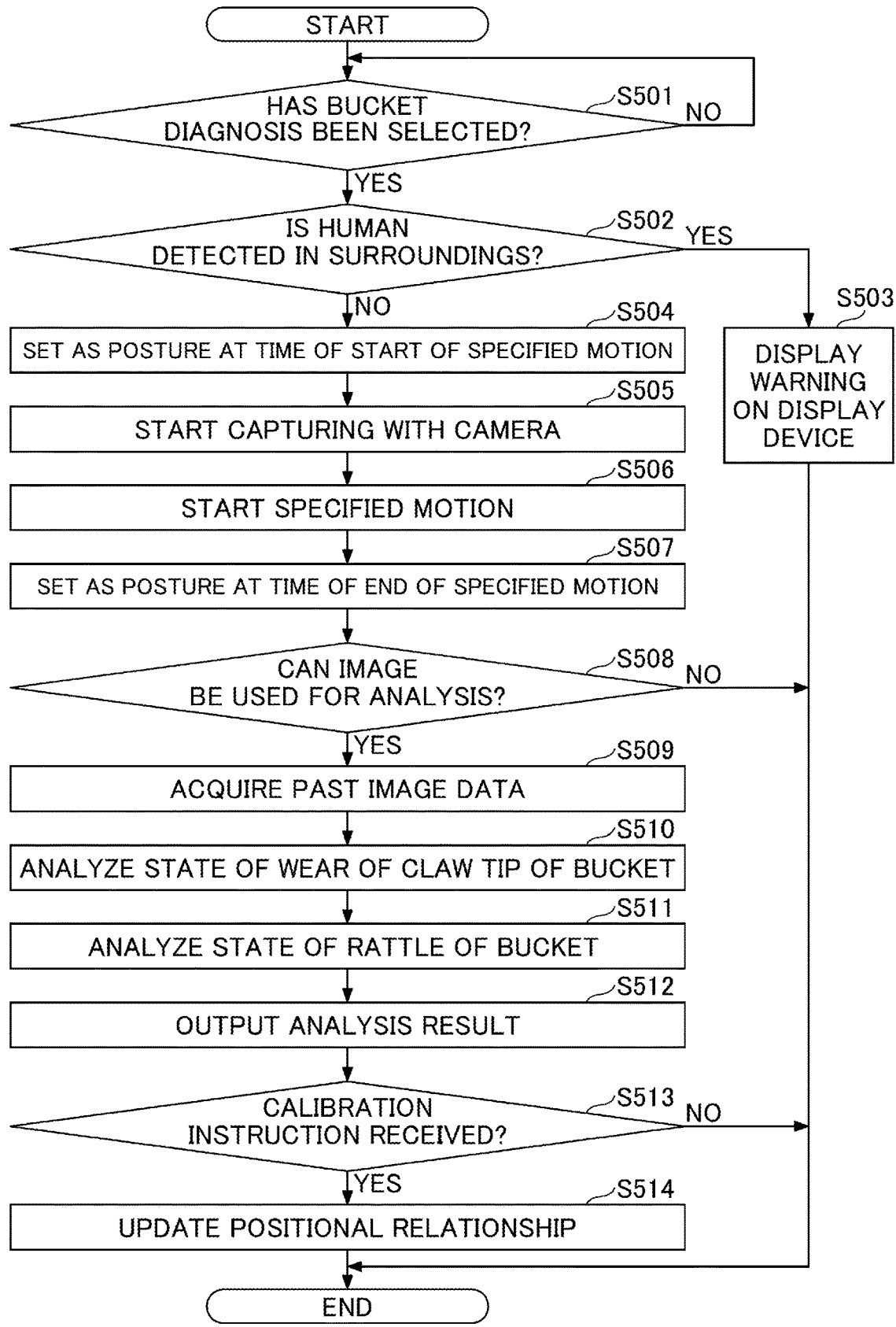
FIG. 5 is a flowchart illustrating the process of the controller in bucket diagnosis.

Hereinafter, the bucket diagnosis process in the excavator PS of the present embodiment will be described with reference to FIG. 5. FIG. 5 is a flow chart illustrating the bucket diagnosis process by the controller 30.

The process illustrated in FIG. 5 illustrates the process of the controller 30 when the diagnosis item "bucket diagnosis" is selected from the diagnosis menu selection screen illustrated in FIG. 4.

First, in step S501, the controller 30 determines, by the diagnosis processing part 30d, whether the diagnosis item "bucket diagnosis" is selected from the diagnosis menu selection screen by the operator. When the diagnosis item "bucket diagnosis" is not selected in step S501, the controller 30 waits until the diagnosis item "bucket diagnosis" is selected.

When the diagnosis item "bucket diagnosis" is selected in step S501, in step S502, the controller 30 determines whether there is a person and the like around the excavator PS by the human detecting part 30c.

In step S502, when a person is detected in the surrounding area, the controller 30 displays a warning indicating the presence of the surrounding person on the display device 40 (step S503), stops the operation of the excavator PS, and ends the process by the diagnosis processing part 30d.

In step S502, when a person is not detected in the surrounding area, in step S504, the controller 30 operates the excavator PS by the diagnosis processing part 30d, so that the excavator PS is in a specified orientation (the first specified orientation) at the start of the specified motion associated with the item "bucket diagnosis". Subsequently, in step S505, the controller 30 starts capturing the image data of the bucket 6 by the object detecting device 80.

Subsequently, the controller 30 causes the excavator PS to perform the specified motion (step S506), and operates the excavator PS to a specified orientation (the second specified orientation) at the end of the specified motion (step S507). The controller 30 continues to capture the image data of the bucket 6 by the object detecting device 80 for a certain period of time after the end of the specified motion. Specifically, the object detecting device 80 may continue capturing the image data from the end of the specified motion until the bucket 6 becomes stationary, and terminate the capturing of the image data after the bucket 6 becomes stationary.

When the capturing of the image data by the object detecting device 80 is ended, the controller 30 may store transmission information in which this image data is associated with information identifying the specified motion, in the transmission information storage part 30b.

In the following description, the image data obtained by staring the capturing in step S506 may be referred to as the image data of the immediately preceding specified motion.

Subsequently, in step S508, the controller 30 determines whether the image data of the immediately preceding specified motion is image data that can be used for analysis by the analyzing part 30g. Specifically, the diagnosis processing part 30d determines whether the image quality of the image data of the immediately preceding specified motion is image quality by which the shape or motion of the bucket 6 can be detected.

In step S508, when the image data of the immediately preceding specified motion has image quality by which the shape or motion of the bucket 6 cannot be detected, the controller 30 ends the process. The image quality by which the shape or motion of the bucket 6 cannot be detected means image quality by which the shape of the bucket 6 cannot be recognized due to, for example, the light intensity.

When the image data of the immediately preceding specified motion is image data that can be used for analysis by the analyzing part 30g in step S508, in step S509, the controller 30 acquires, by the data acquiring part 30f, image data captured when the same type of specified motion as that performed in step S504 to step S507 has been performed in the past. In the following description, the image data acquired in step S509 may be referred to as image data of a past specified motion.

The image data acquired in step S509 may be acquired from the transmission information stored in the transmission information storage part 30b, for example. The image data acquired in step S509 may be obtained by transmitting an image data acquisition request by the controller 30 to the management apparatus 90 and receiving the image data from the management apparatus 90.

Subsequently, in step S510, the controller 30 compares, by the analyzing part 30g, the image data (the first image data) of the immediately preceding specified motion with the image data (the second image data) of a past specified motion acquired in step S509, and analyzes the state of wear of the claw tip of the bucket 6.

Hereinafter, the processing of step S510 by the analyzing part 30g will be described. First, the case in which the image data of the preceding specified motion and the image data of the past specified motion are both moving image data will be described.

In this case, the analyzing part 30g acquires, for example, a frame image of a predetermined timing included in moving image data of an immediately preceding specified motion and a frame image of a predetermined timing included in moving image data of a past specified motion acquired in step S509. That is, in this case, a frame image at a timing when the excavator PS is in certain specified orientation in the immediately preceding specified motion and a frame image at a timing when the excavator PS is in the same specified orientation as the certain specified orientation in the past specified motion, are extracted.

The analyzing part 30g obtains the difference between the length of the claw tip of the bucket 6 in the frame image extracted from the moving image data of the immediately preceding specified motion and the length of the claw tip of the bucket 6 in the frame image extracted from the moving image data of the past specified motion. The information representing the obtained difference is used as information representing the amount of wear of the claw tip of the bucket 6.

Next, a case in which the image data of the immediately preceding specified motion and the image data of the past specified motion are still image data will be described. For example, the still image data may be captured when the bucket 6 is in a specified orientation at the start of the specified motion, or the still image data may be captured when the bucket 6 is in a specified orientation at the end of the specified motion.

In this case, for example, the analyzing part 30g may compare the still image data of the immediately preceding specified orientation with the still image data of the past specified orientation, obtain the difference in the claw tip length of the bucket 6 between the two still images, and use the obtained difference as the analysis result. As described above, according to the present embodiment, the operator and the like can identify the extent of wear of the claw tip of the bucket 6 at the time of the immediately preceding specified motion compared to when the past specified motion had been performed.

That is, the analyzing part 30g according to the present embodiment is an example of a comparing part that compares the first image data in which the specified orientation is captured at a first timing with the second image data in which the specified orientation is captured at a different timing from the first timing.

In the above-described description, in the analysis of the state of the wear of the claw tip of the bucket 6, the image data of the immediately preceding specified motion is compared with the image data of the past specified motion, but the present embodiment is not limited thereto.

The analyzing part 30g may compare image data of the immediately preceding specified motion (specified orientation) with image data of the specified orientation of the bucket 6 captured when the bucket 6 has not yet been used. In this case, the amount of wear of the claw tip of the bucket 6 from the unused state can be obtained.

The analyzing part 30g may compare both image data acquired in the past specified motion and image data of the bucket 6 when the bucket 6 is in an unused state, with image data acquired in the immediately preceding specified motion.

In this way, the operator can visually identify the difference in the extent of wear of the claw tip according to the work environment.

For example, it is assumed that the period from when the bucket is unused to when the image data of a past specified orientation is acquired, is approximately the same as the period from when the image data of a past specified orientation is acquired to when the image data of an immediately preceding specified orientation is acquired. In this case, if the amount of wear of the claw tip obtained by comparing the image data of the unused state with the image data of the past specified orientation, is different from the amount of wear of the claw tip obtained by comparing the image data of the past specified orientation with the image data of the immediately preceding specified orientation, it can be considered that the work environment of the excavator PS has been different.

Accordingly, in such a case, the controller 30 may display information indicating the work environment for each period, together with information indicating the amount of wear of the claw tip for each period. In this case, the information indicating the work environment may be position information acquired by the excavator PS.

Subsequently, in step S511, the controller 30 compares, by the analyzing part 30g, the image data of the immediately preceding specified motion with the image data of the past specified motion acquired in step S509, and analyzes the degree of the rattle of the bucket 6.

The rattle of the bucket 6 is an unstable motion caused by a gap or vibration caused by, for example, wear of a component forming a link mechanism that rotates the bucket 6 with respect to the arm 5. When the rattling occurs, it is difficult to position the bucket 6. Further, rattling is increased by, for example, sand or the like entering into the link mechanism and accelerating wear, and, therefore, it is preferable to periodically confirm the variations in the degree of rattle.

Hereinafter, the processing of step S511 by the analyzing part 30g will be described. For the analysis of the state of rattle, moving image data is used. Therefore, the image data (the first moving image data) of the immediately preceding specified motion and the image data (the second moving image data) of the past specified motion are both moving image data.

The analyzing part 30g calculates the movement width of the image of the bucket 6 in the moving image after the timing when the specified motion ends, in the moving image indicated by the image data of the immediately preceding specified motion. The analyzing part 30g uses this movement width as information indicating the degree of the rattle when the immediately preceding specified motion is performed.

The analyzing part 30g calculates the movement width of the image of the bucket 6 in the moving image data from the timing when the specified motion is ended to the timing when the capturing of image data is ended, in the image data of the past specified motion, and uses this movement width as information indicating the degree of the rattle when the specified motion has been performed in the past.

That is, in the present embodiment, the oscillation width of the bucket 6 at the end of the specified motion is calculated as the movement width (the degree of rattle) of the image of the bucket 6 in the moving image. The analyzing part 30g may calculate the movement width (degree of rattle) of the image of the bucket 6, by superimposing image data within a predetermined period of time during the specified motion.

In the present embodiment, for example, the maximum value of the oscillation width of the bucket 6 at the end of the specified motion of turning the upper turning body 3 while maintaining the orientation of the attachment, may be detected as the oscillation width of the bucket 6 in the horizontal direction. That is, the horizontal oscillation width is the maximum value of the movement width of the bucket 6 in the Y-direction on the YZ plane of FIG. 1, at the end of the specified motion.

In the present embodiment, for example, the maximum value of the oscillation width of the bucket 6 at the end of the specified motion including the motion of changing the angle of the bucket 6 with respect to the arm 5, may be detected as the oscillation width of the bucket 6 in the vertical direction. That is, the vertical oscillation width is the maximum value of the movement width in the Z direction on the YZ plane of FIG. 1 at the end of the specified motion. In the present embodiment, the maximum value of the movement width of the bucket 6 between the end of the specified motion and the pause of the bucket 6 in the moving image data is regarded as the degree of rattle, but the present embodiment is not limited thereto.

For example, the degree of rattle may be calculated by using the time taken for the bucket 6 to be stationary after the specified motion is ended, or by using the accumulation value of accumulated movement width of the bucket 6 from when the specified motion is ended until the bucket 6 becomes stationary.

The analyzing part 30g compares the degree of rattle at the time when the immediately preceding specified motion has been performed, with the degree of rattle at the time when the past specified motion has been performed, and uses the comparison result as the analysis result.

That is, the analyzing part 30g according to the present embodiment is an example of a comparing part that compares first moving image data obtained by capturing the bucket 6 that has started a specified motion at a first timing, with second moving image data acquired by capturing the bucket 6 that has started a specified motion at a second timing that is different from the first timing.

When the analyzing part 30g according to the present embodiment acquires information representing the amount of wear of the claw tip of the bucket 6 and information representing the degree of the rattle, information representing the state of the bucket 6 may be generated based on these pieces of information, and may be included in the analysis result.

In the above-described embodiment, the range of capturing the image data by the object detecting device 80 is targeted at the bucket 6. However, the image data capturing range may include the arms 5 and the boom 4. This allows for a determination of whether the rattle of the bucket 6 depends on the wear of the link mechanism or on the wear of the arm pin or the wear of the boom pin.

Subsequently, in step S512, the controller 30 outputs an analysis result obtained by the output part 30h. That is, the controller 30 causes the image display part 41 of the display device 40 to display the transmission information including the analysis results.

Subsequently, in step S513, the controller 30 determines whether the operator has instructed to calibrate the positional relationship between the claw tip of the bucket 6 and the position of the boom foot pin. Specifically, the controller 30 determines whether an operation instructing calibration is performed on the screen of the analysis result displayed on the image display part 41 in step S512.

In step S513, when an operation instructing calibration is performed, the controller 30 calibrates the positional relationship with the boom foot pin position by the calibration part 30e (step S514) and ends the process. In step S513, if an operation to instruct calibration is not performed, the controller 30 ends the process.

In the present embodiment, the transmission information displayed on the image display part 41 in step S512 may be transmitted to the management apparatus 90 and stored in the management apparatus 90.

Figure 6:
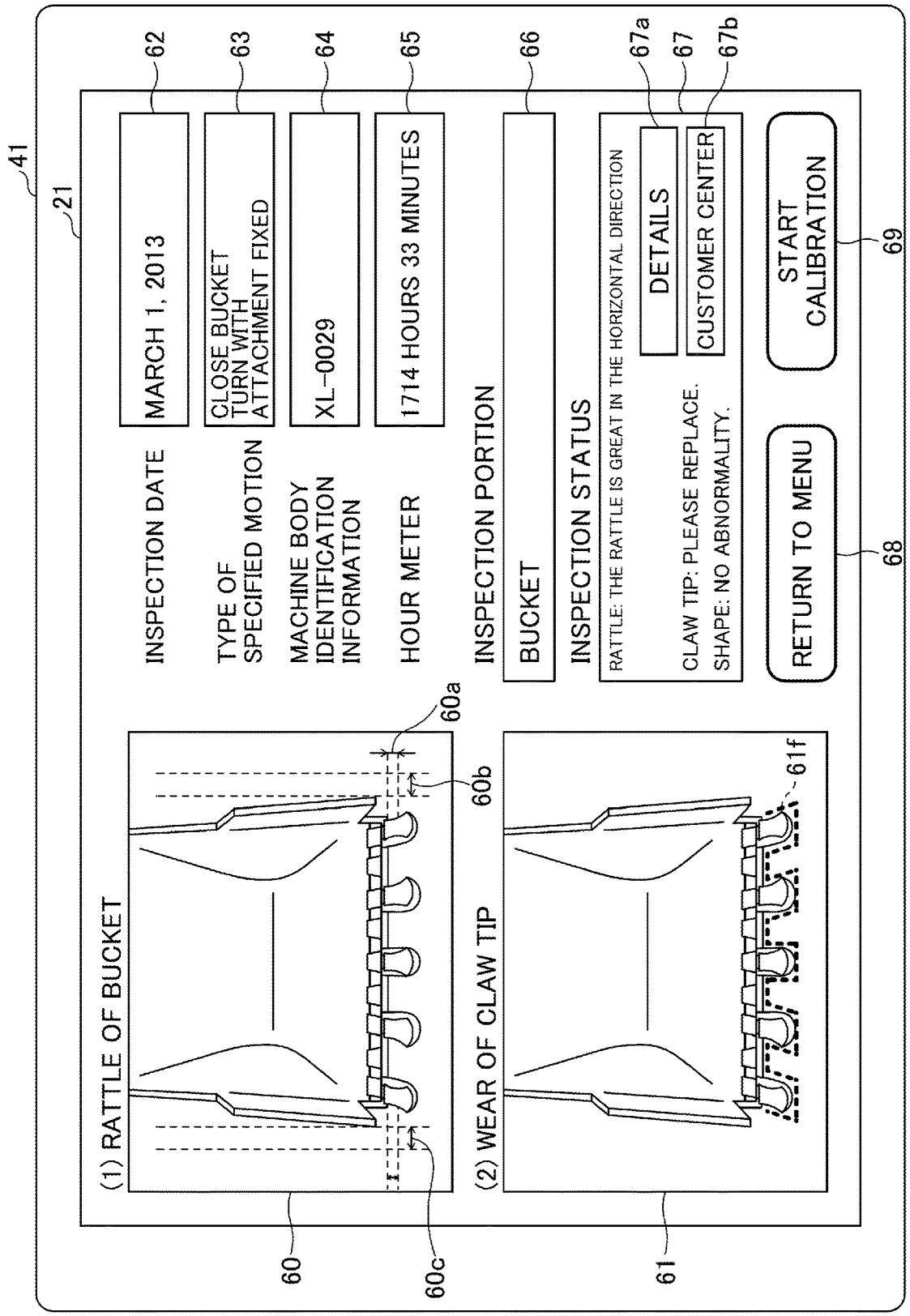
FIG. 6 is a first diagram illustrating an example of an output of an analysis result.

Next, an example of an output of an analysis result will be described with reference to FIG. 6. FIG. 6 is a first diagram illustrating an example of an output of an analysis result.

A screen 21 illustrated in FIG. 6 is an example of the screen displayed on the image display part 41. The screen 21 includes a first image display area 60, a second image display area 61, an inspection date display area 62, a specified motion display area 63, a machine body identification information display area 64, an hour meter display area 65, an inspection portion display area 66, and an inspection status display area 67. A button 68 and a button 69 are displayed on the screen 21.

The first image display area 60 displays information indicating the degree of the rattle of the bucket 6 included in the analysis result, together with the image of the bucket 6. In the second image display area 61, information indicating the amount of wear of the claw tip of the bucket 6 included in the analysis result is displayed, together with the image of the bucket 6. The first image display area 60 may also include images of the arm 5 and the boom 4.

The image of the bucket 6 displayed on the first image display area 60 and the second image display area 61 is, for example, an image in which the bucket 6 is captured from the front.

The inspection date display area 62 displays the date on which the immediately preceding specified motion was performed. The inspection date display area 62 may include the date on which the past specified motion was performed. The specified motion display area 63 displays information identifying the specified motion. The machine body identification information display area 64 displays the machine body identification information that is information identifying the excavator PS.

The hour meter display area 65 displays the operating time of the excavator PS. The inspection portion display area 66 displays information indicating the portion that has been the target of the diagnosis. The inspection status display area 67 displays information indicating the state of the inspection portion obtained from the analysis results.

That is, information including all information displayed in each display area of screen 21 is transmission information, and information displayed in the first image display area 60, the second image display area 61, and the inspection status display area 67 is information representing an analysis result included in the transmission information.

In the first image display area 60, an image of the bucket 6, a height 60*a* in the vertical direction, and widths 60*b* and 60*c* in the horizontal direction are displayed.

In the example of FIG. 6, the height 60*a* indicates the degree of the vertical rattle of the bucket 6, and the sum of the width 60*b* and the width 60*c* indicates the degree of the rattle in the horizontal direction of the bucket 6.

Further, in the specified motion display area 63, a name "close bucket" of the specified motion is displayed as information indicating the specified motion corresponding to the first image display area 60. Further, in the specified motion display area 63, a name "turn with attachment fixed" of a specified motion is displayed as information representing the specified motion corresponding to the first image display area 60.

In the present embodiment, by displaying the specified motion performed and the information indicating the degree of the rattle detected during the specified motion, the operator and the like of the excavator PS can easily identify the degree of rattle that will occur by performing what kind of motion.

In the second image display area 61, an image of the bucket 6 and information indicating the amount of wear of the claw tip of the bucket 6 are displayed.

The information indicating the amount of wear of the claw tip of the bucket 6 is specifically the difference between a shape 61*f* and the claw tip of the bucket 6. The shape 61*f* indicates the shape of the claw tip of the bucket 6 immediately after the replacement (an unused claw tip).

In the present embodiment, as the difference between the shape 61*f* and the shape of the claw tip of the bucket 6 becomes greater, it will be indicated that the amount of wear of the claw tip of the bucket 6 is greater. In the present embodiment, the image representing the shape of the claw tip of the bucket 6 immediately after the replacement is superimposed on the image of the current claw tip, so that the amount of wear of the current claw tip with respect to the claw tip immediately after the replacement can be visually recognized.

Therefore, according to the present embodiment, the operator and the like of the excavator PS can easily identify the amount of wear of the claw tip of the bucket 6.

The amount of wear of the claw tip of the bucket 6 can be calculated for each claw. In particular, the central claw and the right and left claws are important in construction work, and, therefore, the amount of wear of the claw tip of the bucket 6 may be calculated only for the central claw and the right and left claws.

In the inspection status display area 67 according to the present embodiment, information indicating the state of the bucket 6 is displayed. Specifically, a message indicating that the rattle in the horizontal direction is great and a button 67*a* for causing the screen to transition to a screen for displaying details relating to the rattle of the bucket 6 are displayed in association with each other in the inspection status display area 67.

The inspection status display area 67 displays, in association with each other, a message prompting the replacement of the claw tip and a button 67*b* for calling the customer center where the claw tip can be replaced.

Further, the analyzing part 30*g* according to the present embodiment may, for example, determine whether there is a change in the shape of the bucket 6 as a result of a comparison of the image data obtained immediately before and the past image data, and include the result in information indicating the state of the bucket 6. In the example of FIG. 6, in the inspection status display area 67, a message indicating that the shape of the bucket 6 is unchanged and there is no abnormality, is displayed.

The case in which there is a change in the shape of the bucket 6, for example, is a case in which a distortion of the bucket 6 occurs or a case in which a hole is formed in the bucket 6.

A button 68 is for causing the screen 21 to transition to a diagnosis menu selection screen. When the operation of selecting the button 68 is performed in the screen 21, the controller 30 causes the screen 21 to transition to the diagnosis menu selection screen.

A button 69 is for instructing calibration to be performed by the calibration part 30*e*. When the operation of selecting the button 69 is performed in the screen 21, calibration is performed by the calibration part 30*e*.

Figure 7:
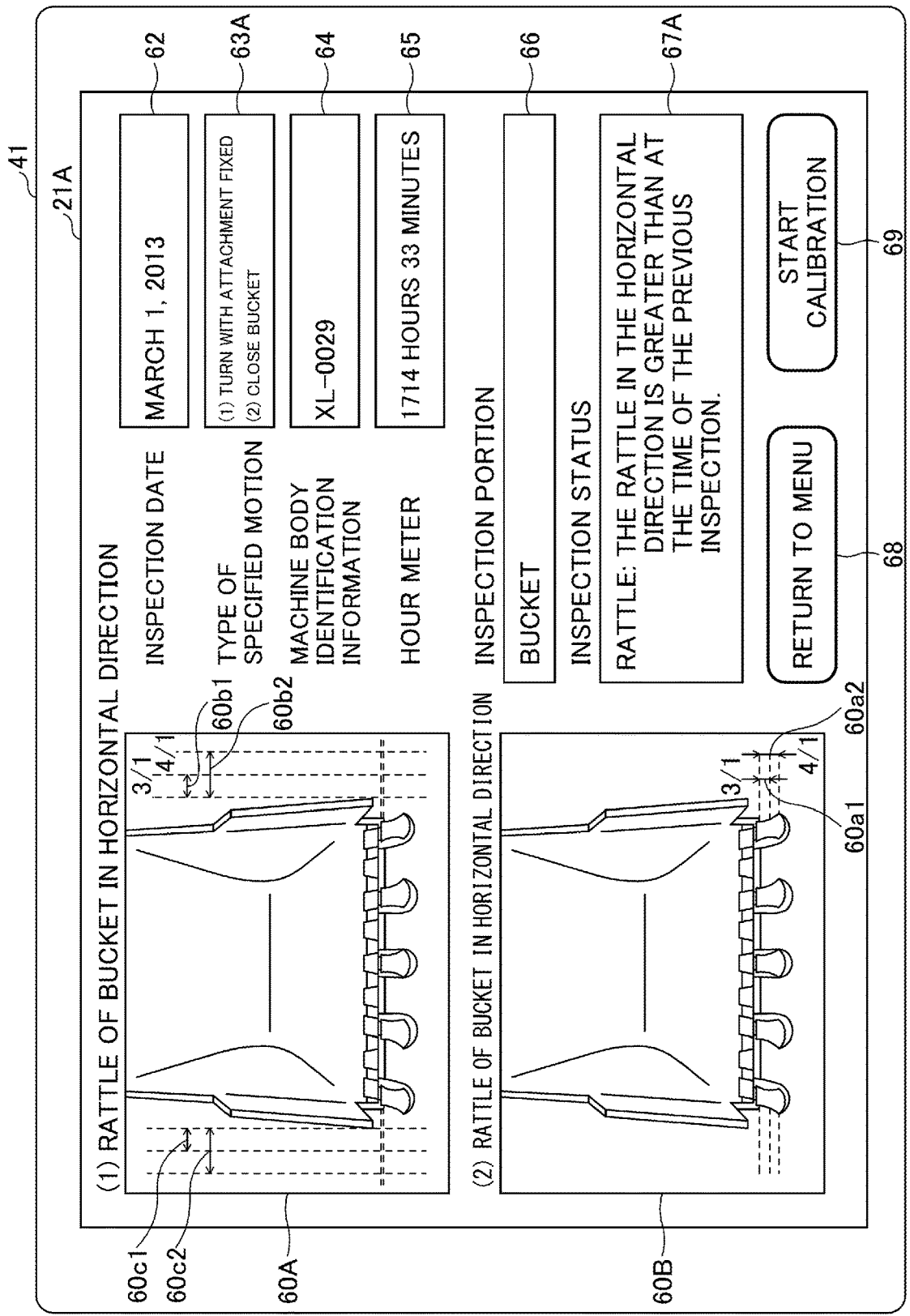
FIG. 7 is a second diagram illustrating an example of an output of an analysis result.

FIG. 7 is a second diagram illustrating an example of an output of the analysis result. A screen 21A illustrated in FIG. 7 illustrates an example of a screen displayed on the image display part 41 when the button 67*a* is selected in the screen 21.

The screen 21A includes a first image display area 60A, a second image display area 61A, the inspection date display area 62, a specified motion display area 63A, the machine body identification information display area 64, the hour meter display area 65, the inspection portion display area 66, and an inspection status display area 67A. A button 68 and a button 69 are displayed on the screen 21A.

In the first image display area 60A, information indicating the degree of the rattle in the horizontal direction of the bucket 6 is displayed, and in the second image display area 61A, information indicating the degree of the rattle in the vertical direction of the bucket 6 is displayed.

In the first image display area 60A illustrated in FIG. 7, for example, the difference between the degree of the rattle in the horizontal direction of the bucket 6 when the previous specified motion was performed and the degree of the rattle in the horizontal direction when the current specified motion was performed is also displayed.

Specifically, in the first image display area 60A, the sum of the width 60*b*1 and the width 60*c*1 indicates the degree of rattle in the horizontal direction of the bucket 6 when the previous specified motion was performed.

In the first image display area 60A, the sum of the width 60*b*2 and the width 60*c*2 indicates the degree of rattle in the horizontal direction of the bucket 6 when the current specified motion was performed.

In the first image display area 60A, the width 60*b*2 and the width 60*c*2 are larger than the width 60*b*1 and the width 60*c*1, respectively, indicating that the rattle in the horizontal direction of the bucket 6 has increased.

Similarly, in the second image display area 61A, for example, the difference between the degree of the rattle in the vertical direction of the bucket 6 when the previous specified motion was performed and the degree of the rattle in the vertical direction when the current specified motion was performed is also displayed.

In the second image display area 61A, the height 60*a*1 indicates the degree of the rattle in the vertical direction of the bucket 6 when the previous specified motion was performed, and the height 60*a*2 indicates the degree of the rattle in the vertical direction of the bucket 6 when the current specified motion was performed. In the example of FIG. 7, it can be seen that the degree of the rattle in the vertical direction has not changed much.

Further, the specified motion display area 63A displays a name "turn with attachment fixed" of the specified motion as information indicating a specified motion corresponding to the first image display area 60A. That is, the specified motion display area 63A displays the name "turn with attachment fixed" of the specified motion for detecting the rattle in the horizontal direction.

Further, the specified motion display area 63A displays a name "close bucket" of the specified motion as information indicating the specified motion corresponding to the second image display area 61A. That is, the specified motion display area 63A displays the name "close bucket" of the specified motion for detecting the rattle in the vertical direction.

The inspection status display area 67A displays a message indicating that the rattle in the horizontal direction has become greater than that at the time when the previous specified motion was performed.

That is, it is indicated that the analyzing part 30*g* has detected that the difference between the previous degree of rattle in the horizontal direction and the current degree of rattle in the horizontal direction is greater than or equal to a certain threshold value.

In the present embodiment, the image display part 41 may display information representing the degree of the rattle in the horizontal direction of the bucket 6 together with the image of the bucket 6 and may also display information representing the degree of the rattle in the vertical direction of the bucket 6 together with the image of the bucket 6.

As described above, by displaying the degree of the rattle of the bucket 6, the operator and the like can visually identify how rattle has occurred.

Figure 8:
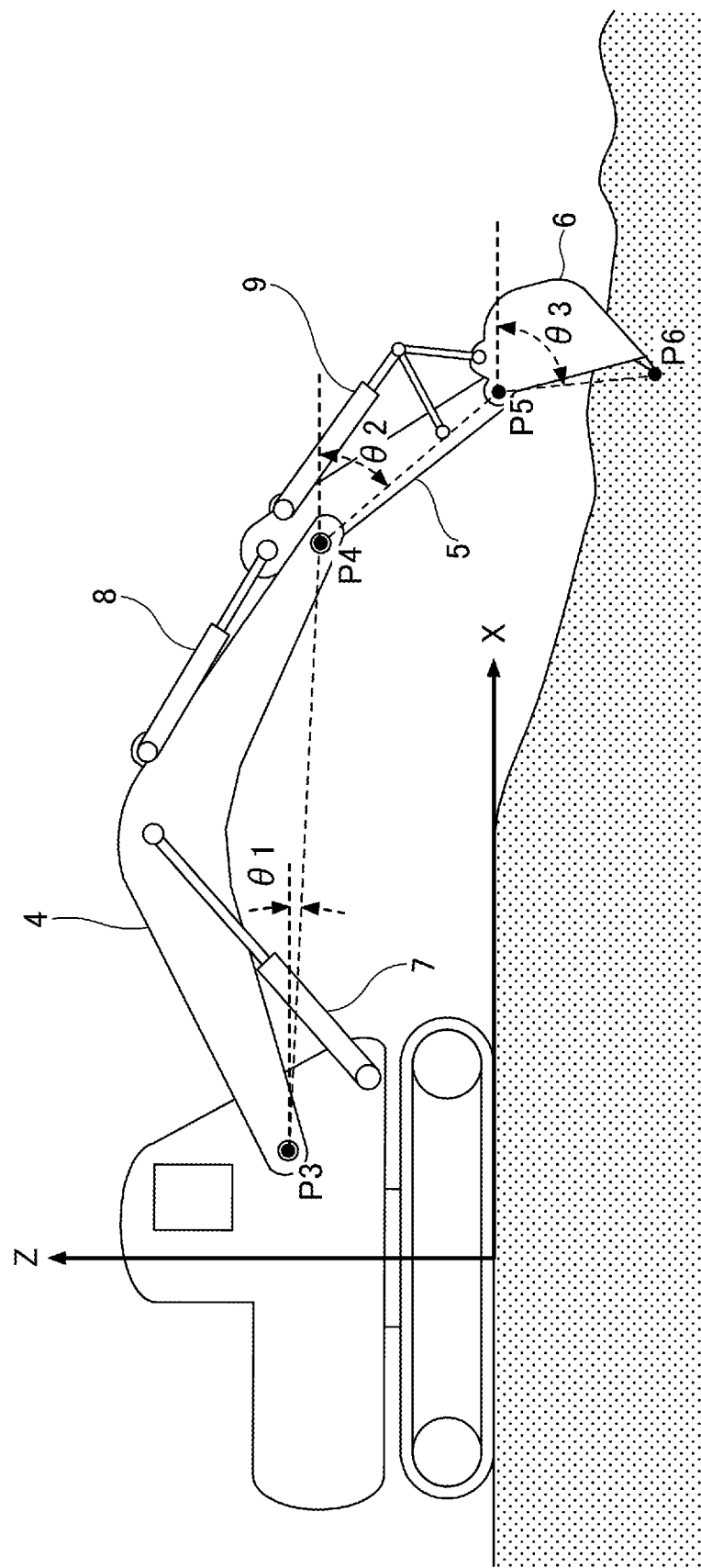
FIG. 8 is a side view of an excavator illustrating various physical quantities associated with an attachment.

Next, the process by the calibration part 30*e* according to the present embodiment will be described with reference to FIG. 8. FIG. 8 is a diagram illustrating calibration of the positional relationship by the calibration part.

FIG. 8 is a side view of the excavator illustrating various physical quantities associated with an attachment. The boom angle sensor S1 acquires, for example, the boom angle ($\theta$1). The boom angle ($\theta$1) is the angle with respect to the horizontal line of the line segment P3-P4 connecting the boom foot pin position P3 and the arm connection pin position P4 in the XZ plane. The arm angle sensor S2 acquires, for example, an arm angle ($\theta$2). The arm angle ($\theta$2) is the angle with respect to the horizontal line of the line segment P4-P5 connecting the arm connection pin position P4 and the bucket connection pin position P5 in the XZ plane. The bucket angle sensor S3 acquires, for example, the bucket angle ($\theta$3). The bucket angle ($\theta$3) is the angle with respect to the horizontal line of the line segment P5-P6 connecting the bucket connection pin position P5 and the bucket claw tip position P6 in the XZ plane.

In the excavator PS, the positional relationship between the bucket claw tip position P6 and the boom foot pin position P3 is determined by the boom angle ($\theta$1), the arm angle ($\theta$2), and the bucket angle ($\theta$3). The position of the bucket claw tip position P6 changes due to the wear of the claw tip of the bucket 6.

When the controller 30 according to the present embodiment receives an instruction to perform calibration of the positional relationship between the claw tip of the bucket 6 and the boom foot pin position P3, the controller 30 updates, by the calibration part 30*e*, the positional relationship between the bucket claw tip position P6 and the boom foot pin position P3 based on the amount of wear of the claw tip of the bucket 6. Specifically, the calibration part 30*e* updates the value of the bucket angle ($\theta$3) that varies due to wear of the claw tip.

As described above, in the present embodiment, the positional relationship between the claw tip of the bucket 6 and the boom foot pin position is updated in accordance with the amount of wear of the claw tip of the bucket 6, and, therefore, even when there is a certain amount of wear at the claw tip of the bucket 6, the claw tip of the bucket 6 can be adjusted to the target position, and thus the accuracy of the operation can be maintained.

As a result, the excavator can accurately move the claw tip of the bucket 6 along a target trajectory (the set work surface and the like.). The present embodiment can also be applied to an excavator by remote control.

As described above, according to the present embodiment, the state of the bucket 6 can be analyzed using image data captured by the object detecting device 80, which is one of the detection values of the state detecting sensor, and the analysis results can be displayed on the display device 40. Thus, according to the present embodiment, it is not necessary to carry out a cumbersome task of visually viewing the bucket 6 and manually measuring the length of the claw tip for confirming the state of the bucket 6, and thus the state of the bucket 6 can be easily identified by an operator or the like.

Another Embodiment

In another embodiment, the management apparatus 90 includes the diagnosis processing part 30*d*, that is included in the excavator PS in the above embodiment. In the following description of another embodiment, elements having the same functional configuration as those of the above embodiment are denoted by reference numerals and symbols used in the description of the above embodiment, and the descriptions thereof are omitted.

Figure 9:
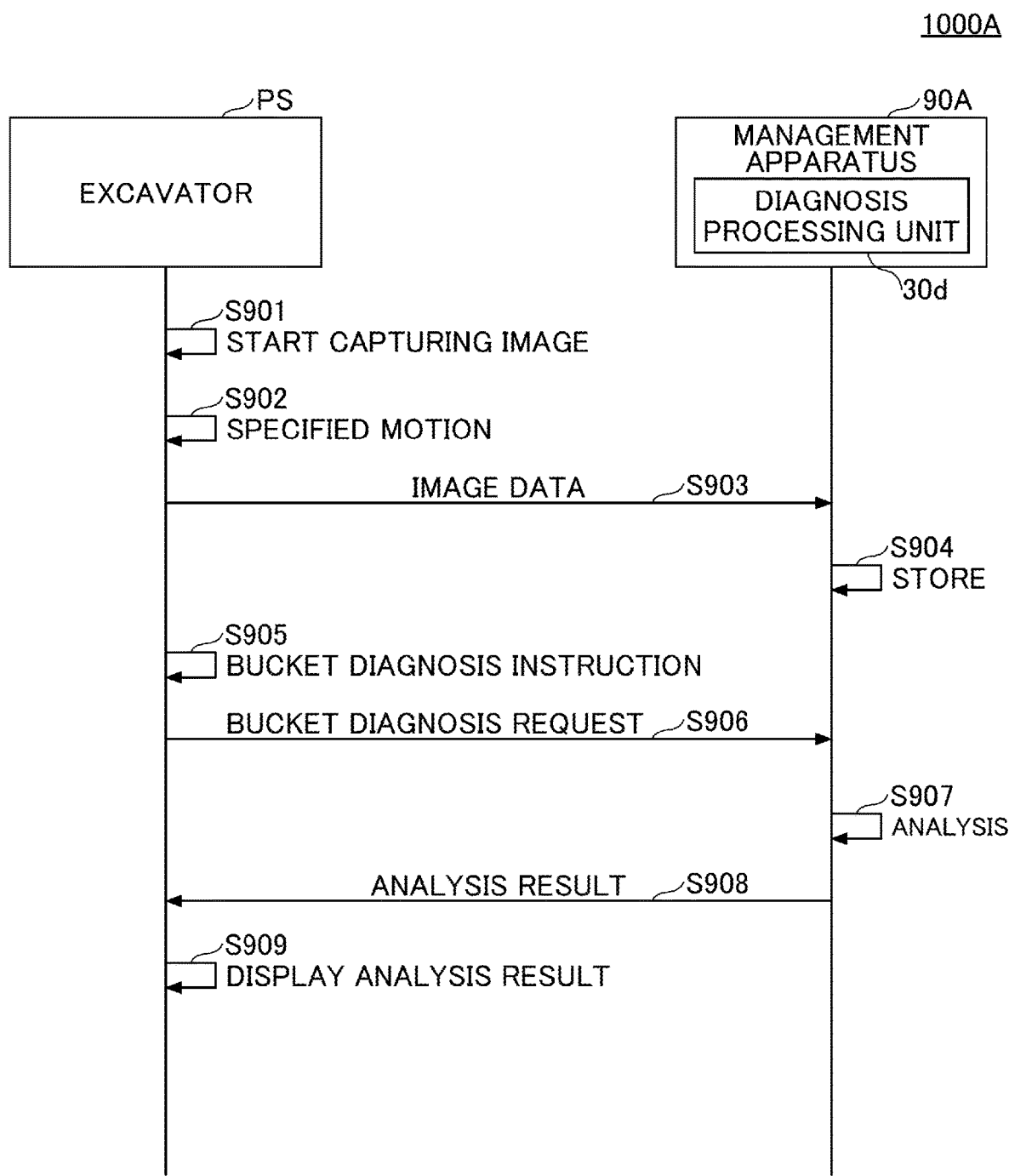
FIG. 9 is a sequence diagram illustrating the operation of the management system of another embodiment.

FIG. 9 is a sequence diagram illustrating the operation of the management system of another embodiment. A management system 1000A includes the excavator PS and a management apparatus 90A. The management apparatus 90A includes the diagnosis processing part 30d.

Accordingly, in the management system 1000A, the excavator PS transmits image data captured by the object detecting device 80 to the management apparatus 90A and receives the result of processing by the diagnosis processing part 30d of the management apparatus 90A.

In step S901, the excavator PS starts capturing image data of the bucket 6 by the object detecting device 80 when a person is not detected in the surrounding area and the excavator PS comes to an orientation of staring the specified motion. Subsequently, the excavator PS performs a specified motion (step S902) and transmits the captured image data to the management apparatus 90A when the specified motion is ended (step S903).

At this time, the image data is transmitted to the management apparatus 90A as the transmission information associated with the information identifying the specified motion. The transmission information may include the date and time when the image data has been captured (the date and time when the specified motion has been performed), the machine body identification information for specifying the excavator PS, and the operation time and the like of the excavator PS.

Subsequently, in step S904, when the management apparatus 90A receives the image data, the image data is stored in the database and the like of the management apparatus 90A.

Subsequently, in step S906, when the diagnosis item "bucket diagnosis" is selected from the selection screen of the diagnosis menu displayed on the image display part 41 (step S905), the excavator PS requests the management apparatus 90A to perform the bucket diagnosis. This request may include machine body identification information identifying the excavator PS.

When the request is received, the management apparatus 90A reads, by the diagnosis processing part 30d, the immediately preceding image data and the past image data corresponding to the machine body identification information included in the request from the database, analyzes the state of the bucket 6 (step S907), and transmits the analysis result to the excavator PS (step S908).

When the excavator PS receives an analysis result, the excavator PS displays the analysis result on the display device 40 (step S909).

As described above, in FIG. 9, the image data captured by the excavator PS may be stored in the management apparatus 90A, and the processing of the diagnosis processing part 30d may be performed in the management apparatus 90A.

Further, in the example of FIG. 9, the analysis result is displayed on the display device 40 of the excavator PS, but the present embodiment is not limited thereto. For example, the analysis result may be displayed on the display part 90c of the management apparatus 90A.

The analysis result may be displayed, for example, on a terminal apparatus or the like which wirelessly communicates with the excavator PS in the vicinity of the excavator PS.

When causing the excavator PS to perform the specified motion, an instruction to execute the specified motion may be transmitted to the excavator PS by wireless communication from the terminal apparatus.

In this case, the terminal apparatus establishes communication with the excavator PS before transmitting the execution instruction of the specified motion, and receives the machine body identification information of the excavator PS from the excavator PS. When the terminal apparatus receives the analysis result from the management apparatus 90A after instructing the execution of the specified motion, the terminal apparatus may display the machine body identification information received from the excavator PS and the analysis result received from the management apparatus 90A on the same screen.

In this way, the excavator PS performs the specified motion by the operation from the terminal apparatus, and the analysis result of analyzing the state of the bucket 6 can be acquired by using the image data acquired during the specified motion.

While the embodiments of the present invention have been described in detail above, the present invention is not limited to the embodiments described above, and various modifications and substitutions can be made to the embodiments described above without departing from the scope of the present invention.

According to an aspect of the present invention, the state of the bucket can be easily identified.

What is claimed is:

1. An excavator comprising:
a processor configured to:
compare first image data obtained by extracting, from first moving image data of an immediately preceding specified motion, the first image data of a bucket at a first timing when the excavator is in a predetermined orientation, with second image data obtained by extracting, from second moving image data of a past specified motion, the second image data of the bucket at a second timing when the excavator is in the same specified orientation, the second timing being temporally preceding the first timing;
obtain information indicating degree of rattle of the bucket and information indicating amount of wear of the bucket based on a comparison between the first image data and the second image data;
output a comparison result obtained by the processor, said comparison result including the information indicating degree of rattle of the bucket and the information indicating amount of wear of the bucket,
update a positional relationship between a position of a claw tip of the bucket and a boom foot pin position based on the comparison result;
update a bucket angle with respect to an arm based on the comparison result, said bucket angle varying due to the amount of wear of the bucket; and
change the bucket angle by hydraulic drive using a bucket cylinder.

2. The excavator according to claim 1, wherein
the processor causes a display device to display, as the amount of wear of a claw tip of the bucket, a difference between an image of the claw tip of the bucket indicated by the first image data, and an image of the claw tip of the bucket indicated by the second image data.

3. The excavator according to claim 1, further comprising:
an object detecting device; and
a human detecting part configured to determine whether there is a person in a surrounding area of the excavator, based on data indicating the surrounding area acquired by the object detecting device, wherein
a motion of the excavator is stopped in response to detecting the person in the surrounding area.

4. The excavator according to claim 1, further comprising:
an object detecting device, wherein the specified orientation is an orientation in which the bucket is open with respect to the object detecting device.

5. The excavator according to claim 1, wherein the first image data and the second image data both indicate a state where the bucket is empty.

6. The excavator according to claim 1, further comprises at least one of an ultrasonic sensor, a millimeter wave radar, a stereo camera, a LIDAR, a distance image sensor or an infrared sensor, wherein the first moving image data and the second moving image data is generated by the at least one of the ultrasonic sensor, the millimeter wave radar, the stereo camera, the LIDAR, the distance image sensor or the infrared sensor.

7. An excavator comprising:
a processor configured to:
compare first moving image data obtained by extracting, from first moving image data of an immediately preceding specified motion, the first image data of a bucket at a first timing when the excavator is in a predetermined orientation, with second image data obtained by extracting, from second moving image data of a past specified motion, the second image data of the bucket at a second timing when the excavator is in the same specified orientation, the second timing being temporally preceding the first timing;
obtain information indicating amount of rattle of the bucket and information indicating amount of wear of the bucket based on a comparison between the first image data and the second image data;
output a comparison result obtained by the processor, said comparison result including the information indicating amount of rattle of the bucket and the information indicating amount of wear of the bucket,
update a positional relationship between a position of a claw tip of the bucket and a boom foot pin position based on the comparison result;
update a bucket angle with respect to an arm based on the comparison result, said bucket angle varying due to the amount of wear of the bucket; and
change the bucket angle by hydraulic drive using a bucket cylinder.

8. The excavator according to claim 7, wherein the processor is further configured to:
compare
a first movement width of an image of the bucket after a timing when the specified motion ends, in a moving image indicated by the first moving image data, with
a second movement width of an image of the bucket after a timing when the specified motion ends, in a moving image indicated by the second moving image data, and
obtain the information indicating degree of rattle of the bucket based on a comparison between the first movement width and the second movement width.

9. The excavator according to claim 8, further comprising:
a lower traveling body;
an upper turning body turnably mounted on the lower traveling body; and
an attachment attached to the upper turning body, wherein the specified motion includes:
a first specified motion including turning the upper turning body while an orientation of the attachment is maintained, and
a second specified motion including changing an angle of the bucket with respect to an arm.

10. The excavator according to claim 9, wherein the processor displays, as information indicating the degree of rattle of the bucket, information indicating either the first movement width or the second movement width, superimposed on an image of the bucket.

11. The excavator according to claim 9, wherein the processor displays, as information indicating the degree of rattle of the bucket, information indicating the first movement width and information indicating the second movement width, superimposed on an image of the bucket.

12. The excavator according to claim 7, wherein the processor is configured to:
obtain a difference between a length of a claw tip of the bucket in the first moving image data and a length of the claw tip of the bucket in the second moving image data, thereby obtaining the information indicating amount of wear of the bucket, and
obtain a difference between a movement width of the bucket in the first moving image data after a timing when a specified motion ends and a movement width of the bucket in the second moving image data after another timing when the specified motion ends, thereby obtaining the information indicating the degree of rattle of the bucket.

13. A management apparatus for an excavator, the management apparatus comprising:
a processor configured to:
compare first image data obtained by extracting, from first moving image data of an immediately preceding specified motion, the first image data of a bucket at a first timing when the excavator is in a predetermined orientation, with second image data obtained by extracting, from second moving image data of a past specified motion, the second image data of the bucket at a second timing when the excavator is in the same specified orientation, the second timing being temporally preceding the first timing;
obtain information indicating degree of rattle of the bucket and information indicating amount of wear of the bucket based on a comparison between the first image data and the second image data;
output a comparison result obtained by the processor,
update a positional relationship between a position of a claw tip of the bucket and a boom foot pin position based on the comparison result;
update a bucket angle with respect to an arm based on the comparison result, said bucket angle varying due to the amount of wear of the bucket; and
change the bucket angle by hydraulic drive using a bucket cylinder.

14. A management apparatus for an excavator, the management apparatus comprising:
a processor configured to:
compare first moving image data obtained by extracting, from first moving image data of an immediately preceding specified motion, the first image data of a bucket at a first timing when the excavator is in a predetermined orientation, with second image data obtained by extracting, from second moving image data of a past specified motion, the second image data of the bucket at a second timing when the excavator is in the same specified orientation, the second timing being temporally preceding the first timing
obtain information indicating degree of rattle of the bucket and information indicating amount of wear of the bucket based on a comparison between the first image data and the second image data;

output a comparison result obtained by the processor, update a positional relationship between a position of a claw tip of the bucket and a boom foot pin position based on the comparison result;

update a bucket angle with respect to an arm based on the comparison result, said bucket angle varying due to the amount of wear of the bucket; and change the bucket angle by hydraulic drive using a bucket cylinder.

* * * * *